US008888043B1

(12) United States Patent
Olliges et al.

(10) Patent No.: US 8,888,043 B1
(45) Date of Patent: Nov. 18, 2014

(54) CREW BUNK SYSTEM AND METHOD

(75) Inventors: Michael J. Olliges, Edmonds, WA (US);
Mark E. King, Arlington, WA (US);
Marc A. Spane, Camano Island, WA (US); Paul A. Kinzer, Bothell, WA (US); Aaron L. Castillo, Seattle, WA (US); Douglas J. Seiersen, Lake Stevens, WA (US); Richard J. Johnson, Freeland, WA (US); Lee L. Smith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 13/610,883

(22) Filed: Sep. 12, 2012

(51) Int. Cl.
*B64D 11/06* (2006.01)

(52) U.S. Cl.
USPC ............... 244/118.6; 244/118.5; 105/316

(58) Field of Classification Search
USPC ............ 244/118.5, 118.6; 105/314–317, 345
See application file for complete search history.

(56) References Cited

U.S. PATENT DOCUMENTS

| | | | | |
|---|---|---|---|---|
| 1,981,212 A * | 11/1934 | Zeller | | 297/65 |
| 2,092,655 A * | 9/1937 | Page, Jr. | | 244/118.6 |
| 2,280,065 A * | 4/1942 | De Roode | | 244/118.6 |
| 2,323,620 A * | 7/1943 | Parke et al. | | 105/315 |
| 2,528,307 A * | 10/1950 | Heaney | | 5/9.1 |
| 2,553,297 A * | 5/1951 | Brumbaugh | | 5/8 |
| 2,556,076 A * | 6/1951 | Evans et al. | | 5/9.1 |
| 2,652,572 A * | 9/1953 | Hopeman, Jr. et al. | | 5/9.1 |
| 2,654,895 A * | 10/1953 | Stevens | | 5/9.1 |
| 2,660,733 A * | 12/1953 | Williams | | 5/9.1 |
| 2,676,334 A * | 4/1954 | Patton et al. | | 5/9.1 |
| 2,700,412 A * | 1/1955 | Evans et al. | | 297/232 |
| 2,783,717 A * | 3/1957 | Meldrum | | 105/317 |
| 3,165,757 A * | 1/1965 | Rogers, Jr. | | 5/13 |
| 3,298,041 A * | 1/1967 | Rogers, Jr. | | 5/13 |
| 3,526,008 A * | 9/1970 | Pruim | | 5/430 |
| 3,898,704 A * | 8/1975 | Gallaher et al. | | 5/2.1 |
| 4,054,956 A * | 10/1977 | Quakenbush | | 5/9.1 |
| 4,279,203 A * | 7/1981 | Marulic | | 105/321 |
| 4,550,946 A * | 11/1985 | Hanemaayer | | 296/156 |
| 4,669,134 A * | 6/1987 | Mikos | | 5/13 |
| 5,031,563 A * | 7/1991 | Matre | | 114/188 |
| 5,259,575 A * | 11/1993 | Cabrera | | 244/118.5 |
| 5,690,355 A * | 11/1997 | Kleinberg | | 280/730.1 |
| 5,876,059 A * | 3/1999 | Kleinberg | | 280/730.1 |
| 6,799,463 B2 | 10/2004 | Fields | | |
| 7,070,149 B2 * | 7/2006 | McDonnell | | 244/118.5 |
| 7,275,716 B2 * | 10/2007 | Saint-Jalmes | | 244/118.6 |
| 7,735,904 B2 * | 6/2010 | Mahoney et al. | | 296/190.02 |

(Continued)

FOREIGN PATENT DOCUMENTS

FR           2576761 A1 *  8/1986  ............. A47C 17/50

*Primary Examiner* — Timothy D Collins
*Assistant Examiner* — Steven Hawk

(57) ABSTRACT

A crew bunk system may include a bunk frame assembly and at least two vertically spaced crew berths. Each one of the crew berths may have a lengthwise hinge line dividing the crew berth into a stationary panel and a foldable panel. The stationary panel may be fixedly coupled to the bunk frame assembly. The foldable panel may be hingedly coupled to the stationary panel along the hinge line. The crew bunk system may include at least one connecting member interconnecting the foldable panels such that the foldable panels pivot in unison between a deployed position and a stowed position. The crew bunk system may include a latching mechanism configured to lock the foldable panels in the stowed position.

18 Claims, 18 Drawing Sheets

(56) References Cited

U.S. PATENT DOCUMENTS

| | | | |
|---|---|---|---|
| 7,883,133 B2* | 2/2011 | Chinn | 296/19 |
| 8,276,962 B2* | 10/2012 | Chinn | 296/19 |
| 8,413,268 B2* | 4/2013 | Amstutz et al. | 5/118 |
| 2003/0057323 A1* | 3/2003 | Keogh | 244/118.5 |
| 2003/0168281 A1* | 9/2003 | Olliges et al. | 182/97 |
| 2004/0035980 A1* | 2/2004 | McDonnell | 244/118.6 |
| 2005/0023413 A1* | 2/2005 | Saint-Jalmes | 244/118.6 |
| 2005/0081293 A1* | 4/2005 | Connell et al. | 5/308 |
| 2009/0206201 A1 | 8/2009 | Johnson | |
| 2011/0114789 A1* | 5/2011 | Ergenci et al. | 244/118.6 |

* cited by examiner

CREW BUNK SYSTEM AND METHOD

FIELD

The present disclosure relates generally to crew rest systems and, more particularly, to a crew bunk system such as for an aircraft.

BACKGROUND

Aircraft that are airborne for extended periods of time may require crew rest areas for the flight crew. In this regard, aerial refueling aircraft and/or long-haul freighter aircraft may include areas where members of the flight crew can rest or sleep for controlled periods of time during non-critical stages of a long-duration flight such that the flight crew can be alert during other stages of the flight. Freighter aircraft may be designed to hold cargo in a cargo area behind the cockpit or crew area. A cargo barrier net is typically required to be installed between the cockpit/crew area and the cargo area to restrain the cargo in the event that the cargo shifts forward due to a sudden deceleration of the aircraft.

A portion of the area between the cockpit/crew area and the cargo net is typically required to be unoccupied during taxi, take-off, and landing. The unoccupied area is intended to provide a region into which the cargo barrier net can stretch or distend under the force of forward-shifting cargo. Unfortunately, the unoccupied area between the cockpit/crew area and the cargo net represents valuable space that could be used for one or more purposes during flight other than during taxi, take-off, and landing.

As can be seen, there exists a need in the art for a crew rest system that may take advantage of the cargo net extension zone during phases of flight other than taxi, takeoff, and landing.

SUMMARY

The above-noted needs associated with crew rest systems are specifically addressed and alleviated by the present disclosure which provides a crew bunk system that may include a bunk frame assembly having at least two vertically spaced crew berths. Each one of the crew berths may have a hinge line dividing the crew berth into a stationary panel and a foldable panel. The stationary panel may be fixedly coupled to the bunk frame assembly. The foldable panel may be hingedly coupled to the stationary panel along the hinge line. The crew bunk system may include at least one connecting member interconnecting the foldable panels such that the foldable panels pivot in unison between a deployed position and a stowed position. The crew bunk system may include a latching mechanism configured to lock the foldable panels in the stowed position.

In a further embodiment, disclosed is a crew bunk system for an aircraft having a bunk frame assembly attached to an aircraft structure. The crew bunk system may include at least two vertically spaced crew berths. Each one of the crew berths may have a lengthwise hinge line dividing the crew berth into a stationary panel and a foldable panel. The stationary panel may be fixedly coupled to the bunk frame assembly. The foldable panel may be hingedly coupled to the stationary panel along the hinge line. The crew bunk system may include at least one connecting member interconnecting the foldable panels such that the foldable panels pivot in unison between a deployed position and a stowed position. The crew bunk system may further include a latching mechanism coupled to at least one of the crew berths and which may be configured to lock the foldable panels in the deployed position and in the stowed position.

Also disclosed is a method of operating a crew bunk system including the step of providing at least two vertically stacked crew berths wherein each one of the crew berths may have a stationary panel and a foldable panel hingedly coupled to the stationary panel. The method may further include interconnecting the foldable panels with a connecting member, pivoting the foldable panels in unison between a deployed position and a stowed position, and locking the foldable panels in the stowed position.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
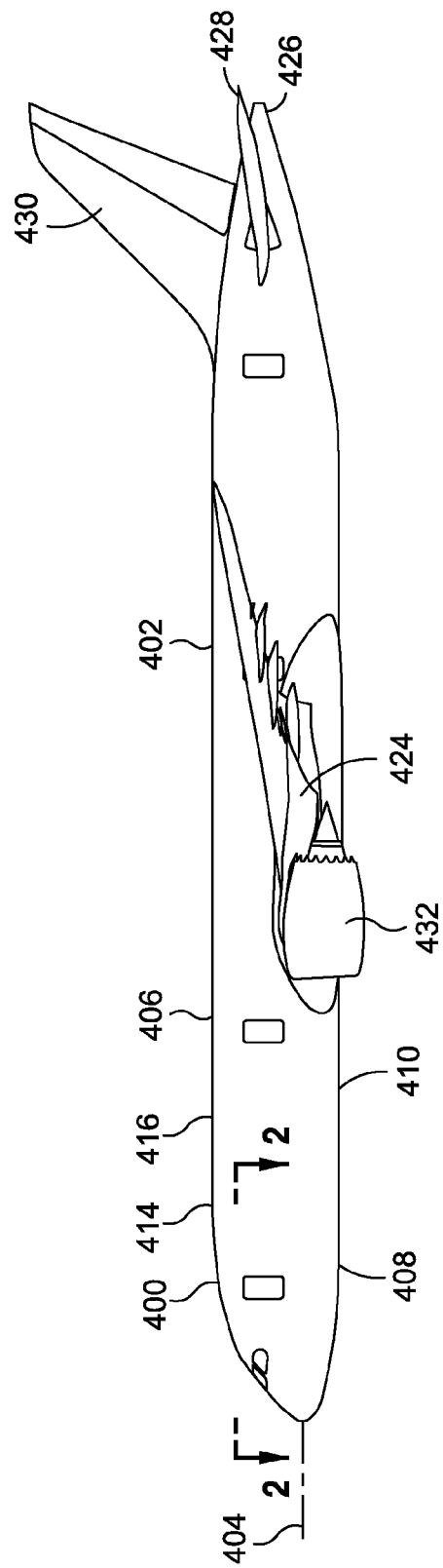
FIG. 1 is a perspective view of an aircraft.

Referring now to the drawings wherein the showings are for purposes of illustrating various embodiments of the present disclosure, shown in FIG. 1 is a perspective illustration of an aircraft 402 which may incorporate one or more embodiments of a collapsible crew bunk system 100 (FIG. 3) as disclosed herein. The aircraft 402 may include a fuselage 406 which may extend from a nose at a forward end of the aircraft 402 to an empennage 426 at an aft end of the aircraft 402 and which may define a longitudinal axis 404. The empennage 426 may include one or more tail surfaces such as a vertical stabilizer/rudder 430 and/or a horizontal stabilizer/elevator 428 for control of the aircraft 402. The aircraft 402 may further include a pair of wings 424 and one or more propulsion units 432.

Although the crew bunk system 100 of the present disclosure is described in the context of a fixed wing passenger aircraft such as the tube-and-wing aircraft 402 illustrated in FIG. 1, embodiments of the crew bunk system 100 may be applied to any aircraft of any configuration, without limitation. In this regard, the crew bunk system 100 may be applied to any civil, commercial, or military aircraft. In addition, embodiments of the crew bunk system 100 disclosed herein may be applied to alternative aircraft configurations and are not limited to the tube-and-wing aircraft 402 configuration illustrated in FIG. 1. For example, the disclosed embodiments may be applied to hybrid wing-body aircraft or blended-wing aircraft. The disclosed embodiments are not limited to implementation in fixed-wing aircraft and may be applied to rotor-craft. Furthermore, the disclosed embodiments are not limited to aircraft. In this regard, the disclosed embodiments of the crew bunk system 100 may be implemented in any vehicle 400 of any type, without limitation, including in any marine vessel, land-based vehicles including motor vehicles, air vehicles, and/or space vehicles, or any combination thereof or in any non-vehicular application.

Figure 2:
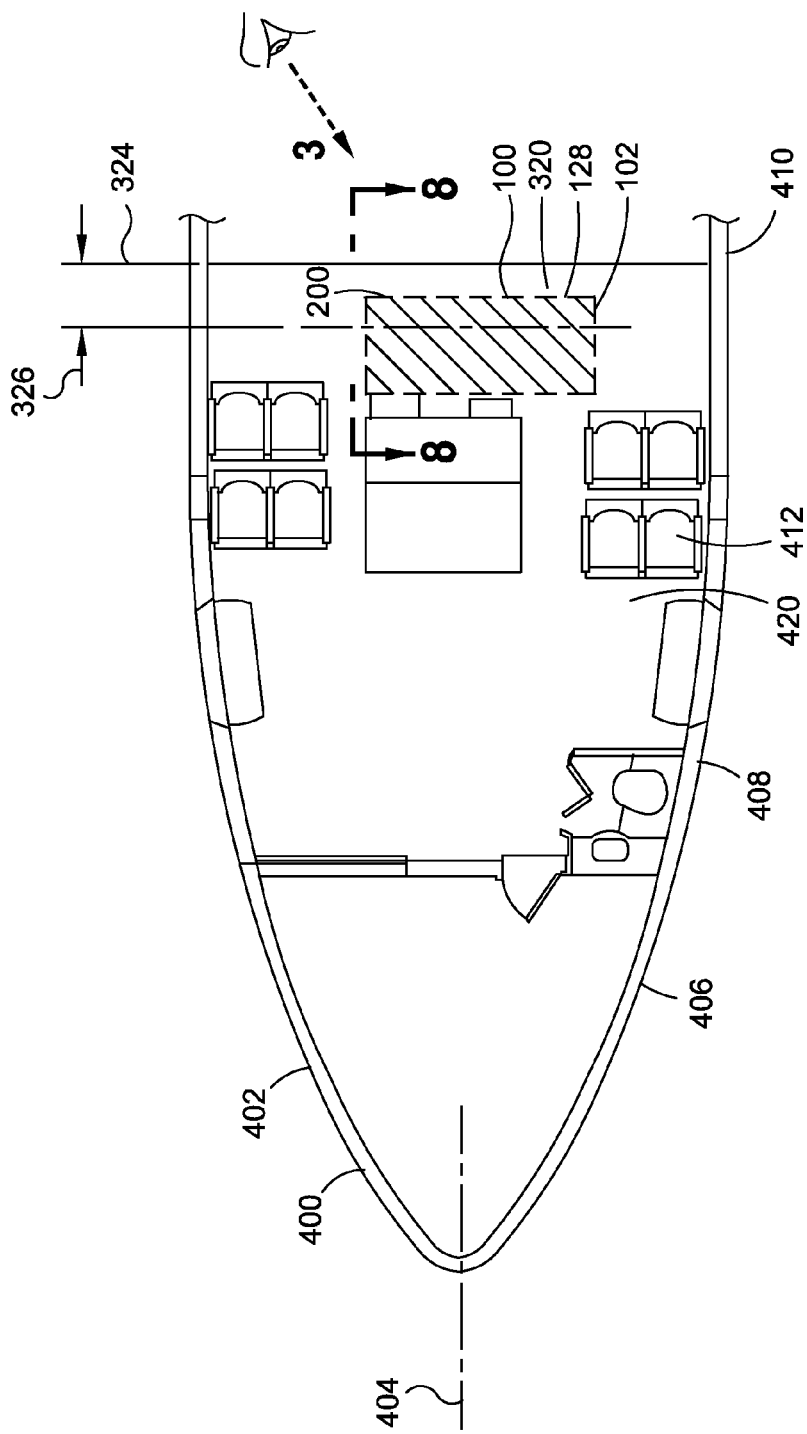
FIG. 2 is a top view of a cockpit and crew area of the aircraft taken along line 2 of FIG. 1 and illustrating a crew bunk system in a deployed position and occupying a deployed footprint.

In FIG. 2, shown is a top view of a forward area of the fuselage 406 on the main deck of an aircraft 402 containing a cockpit and crew area 408 and having the crew bunk system 100 (shown in cross-hatch) positioned within the crew area 408. The crew area 408 may include crew seats 412 and various amenities such as a lavatory and galley (not shown). Located aft of the crew area 408 on the main deck of the aircraft 402 may be a cargo area 410 in addition to one or more cargo holds (not shown) that may be located below the main deck. As indicated above, a cargo barrier net (not shown) may be installed between the crew area 408 and the cargo area 410 to restrain cargo (not shown) against forward movement. In a normal or non-distended position, the cargo barrier net may be located at a cargo net non-distended line 324.

In FIG. 2, a cargo net extension zone 326 may be located between the crew area 408 and the cargo barrier net. The cargo net extension zone 326 is typically required to be unoccupied during certain phases of aircraft operation. For example, the cargo net extension zone 326 may be required to be unoccupied during taxiing, takeoff, and landing in the event that cargo shifts forward due to sudden deceleration of the aircraft 402. The cargo net extension zone 326 represents a region into which the cargo barrier net can stretch or distend under the force of forward-shifting cargo due to aircraft 402 deceleration. The crew bunk system 100 in FIG. 2 is shown in a deployed position 200 and occupying a deployed footprint 320 that may extend at least partially into the cargo net extension zone 326.

Figure 3:
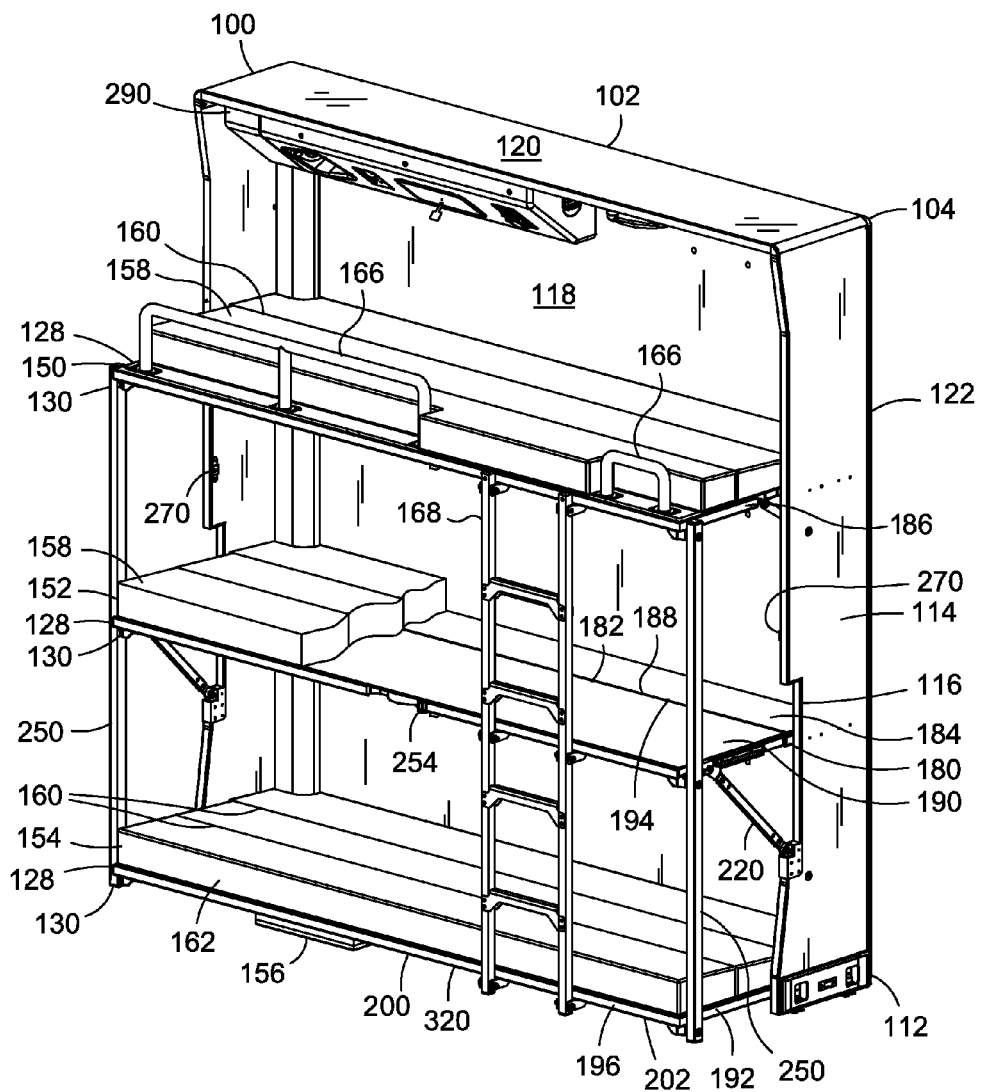
FIG. 3 is a perspective view of the crew bunk system taken along line 3 of FIG. 2 and illustrating a plurality of crew berths in a deployed position.

Advantageously, the crew bunk system 100 as disclosed herein is collapsible into a stowed position 204 (FIG. 6) such as during taxiing, take-off, and/or landing such that the crew bunk system 100 occupies a relatively smaller stowed footprint 322 (FIG. 5) of the crew area 408. In the stowed position 204, the crew bunk system 100 stowed footprint 322 may be located outside of the cargo net extension zone 326. In this manner, the crew bunk system 100 as disclosed herein advantageously eliminates a space interference problem that may otherwise occur between the cargo net extension zone 326 and the crew bunk system 100. Advantageously, the crew bunk system 100 may be provided in an embodiment capable of ergonomically accommodating two or more occupants (e.g., 97th percentile males—not shown) in individual crew berths 128 (FIG. 3). The crew berths 128 are configured to be moved between the deployed position 200 to the stowed position 204 and locked or latched into place in a single movement by a single individual in a relatively short (e.g., several seconds) period of time as described in greater detail below.

FIG. 3 is a perspective view of an embodiment of the crew bunk system 100 wherein the crew berths 128 are in the deployed position 200. The crew bunk system 100 may include a bunk frame assembly 102 that may have an upper end 104 and a lower end 112. The bunk frame assembly 102 forms a frame or structure for the crew bunk system 100. A plurality of crew berths 128 may be attached to the bunk frame assembly 102. Each one of the crew berths 128 may be configured to support an occupant (e.g., a human—not shown) such as in the supine position.

In FIG. 3, each one of the crew berths 128 may comprise a stationary panel 184 and a foldable panel 190 that may be hingedly coupled to the stationary panel 184. The bunk frame assembly 102 may include an opposing pair of substantially vertical side walls 114 that may be interconnected by a substantially vertical back wall 118 and a substantially horizontal top wall 120. In an embodiment, the bunk frame assembly 102 may be configured such that the side walls 114, the back wall 118, and the top wall 120 at least partially enclose the crew berths 128. The stationary panels 184 may be sized to be complementary to a width of each one of the side walls 114 of the bunk frame assembly 102 so that the foldable panels 190 in the stowed position 204 (FIG. 6) are generally aligned with the edges of the side walls 114.

In the embodiment shown in FIG. 2, the crew bunk system 100 may be arranged in the crew area 408 of the aircraft 402 such that the crew berths 128 are oriented generally transverse to the longitudinal axis 404 of the aircraft 402. In addition, the crew bunk system 100 may be arranged such that the crew berths 128 are opened for the cargo area 410 and away from the crew area 408 of the aircraft 402 for privacy. However, the crew bunk system 100 may be positioned in a location within the crew area 408 and may be oriented in any direction and is not limited to a transverse orientation relative to the longitudinal axis 404 of the aircraft 402.

In FIG. 3, the crew bunk system 100 is shown as having three crew berths 128 including an upper crew berth 150, a middle crew berth 152, a lower crew berth 154 and which may be vertically stacked relative to one another. However, the crew bunk system 100 may be provided with any number of crew berths 128. Each one of the crew berths 128 may have a lengthwise hinge line 182 dividing the crew berth 128 into a relatively rigid or stiff stationary panel 184 and a relatively rigid or stiff foldable panel 190. The stationary panel 184 may be fixedly coupled to the bunk frame assembly 102. For example, the stationary panel ends 186 may be fixedly coupled to the side walls 114 of the bunk frame assembly 102. The stationary panel 184 inner sides may be coupled to the back wall 118 of the bunk frame assembly 102.

Figure 6:
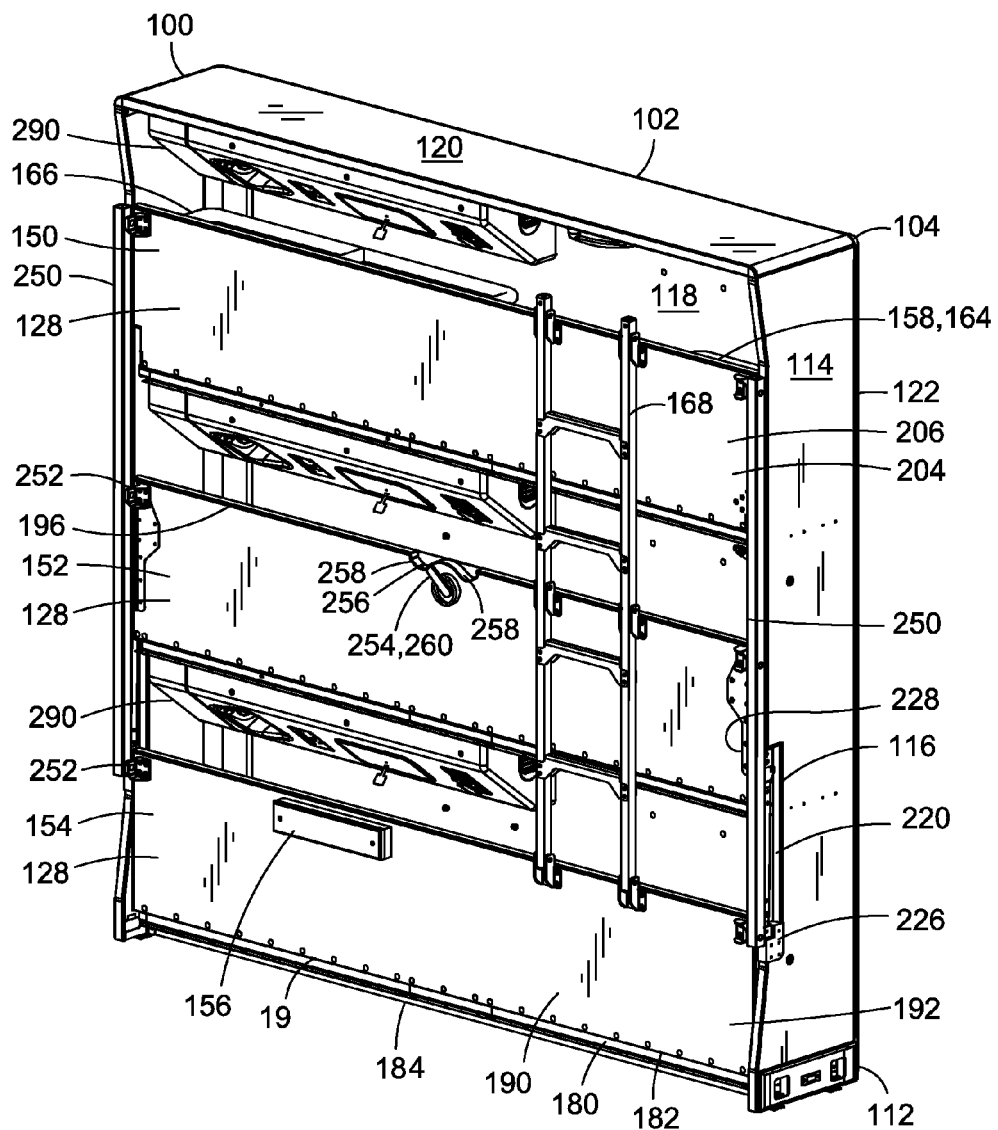
FIG. 6 is a perspective view of the crew bunk system taken along line 6 of FIG. 5 and illustrating the plurality of crew berths in a stowed position.

The foldable panel 190 may have a foldable panel hinge side 194 that may be hingedly coupled to the stationary panel hinge side 188 by one or more hinges 180 extending along the hinge line 182. For example, each foldable panel 190 may be hingedly coupled to a stationary panel 184 by means of a substantially continuous hinge 180 such as piano hinge. However, a foldable panel 190 may be hingedly coupled to a stationary panel 184 by a plurality of discrete, individual hinges (not shown) that may be spaced along the hinge line 182. The foldable panel 190 of each one of the crew berths 128 may be configured to be pivotable from a substantially horizontal orientation 202 in the deployed position 200 (FIG. 3) to a substantially vertical orientation 206 in the stowed position 204 (FIG. 6). However, one or more of the foldable panels 190 may be configured to be movable between any set of orientations. For example, one or more of the foldable panels 190 may be positioned in a non-vertical orientation 206 (not shown) when placed in the stowed position 204 and/or a non horizontal orientation 202 (not shown) when placed in the deployed position 200.

Referring to FIG. 3, each one of the crew berths 128 may include a crew berth mattress 158. The crew berth mattress 158 may be formed of a relatively soft, resilient material such as lightweight foam. Each one of the crew berth mattresses 158 may be configured to be foldable to facilitate moving the foldable panels 190 into the stowed position 204 (FIG. 6). For example, the crew berth mattresses 158 may include one or more generally lengthwise and parallel fold lines 160 to facilitate folding the crew berth mattress 158 from an unfolded position 162 (FIG. 8) into a folded position 164 (FIG. 9). One or more of the crew berths 128 may include one or more railings 166 mounted to the foldable panel outer side 196 for preventing an occupant from falling out of the crew berth 128.

In FIG. 3, the crew bunk system 100 may include one or more connecting members 250 interconnecting the foldable panels 190. The embodiment shown in FIG. 3 includes a pair of connecting members 250 pivotably coupled to each one of the foldable panels 190. Although each one of the connecting members 250 is shown as a generally vertically-oriented, unitary rod, rail, or post, each connecting member 250 may be formed in any size, shape or configuration, without limitation.

The connecting members 250 may be pivotably attached to the foldable panels 190. For example, the connecting members 250 may be pivotably coupled to the foldable panel ends 192 such as at the outer corners 130 of the foldable panels 190. However, the connecting members 250 may be coupled to the foldable panels 190 at any location.

Advantageously, the connecting members 250 may facilitate moving the foldable panels 190 in unison between the deployed position 200 (FIG. 3) and the stowed position 204 (FIG. 6). The connecting member 250 may also transmit crew berth download forces 280 onto a floor structure 420 (FIG. 2) when the foldable panels 190 are in the deployed position 200. Such crew berth download forces 280 may be due to the weight of the crew berth 128 and/or the weight of an occupant occupying the crew berths 128 and which may be magnified under vertical acceleration such as due to aircraft 402 turbulence or during flight maneuvers of the aircraft 402 (FIG. 2).

The crew bunk system 100 may optionally include an access ladder 168 to facilitate access by an occupant to the middle crew berth 152 and/or to the upper crew berth 150. The access ladder 168 may be pivotably coupled to the outer side of one or more of the foldable panels 190. In an embodiment not shown, the access ladder 168 may function as the connecting member 250 coupling the foldable panels 190 together and the connecting members 250 at the foldable panel 190 outer corners 130 may be omitted.

In FIG. 3, the crew bunk system 100 may include one or more pivoting braces 220. For example, the crew bunk system 100 may include a pivoting brace 220 extending between each one of the side walls 114 to one of the crew berths 128. In the embodiment shown, the middle crew berth 152 may include pivoting braces 220 extending between each one of the foldable panels 190 and the side walls 114. As described below, the pivoting braces 220 may advantageously be lockable to the foldable panel 190 when the foldable panel 190 is in the deployed position 200. Locking of the foldable panel 190 in the deployed position 200 may be facilitated by a latching mechanism 254 (FIG. 15) as described in greater detail below. In addition, each one of the pivoting braces 220 may be configured to transmit crew berth upload forces 282 from the foldable panels 190 into the side walls 114. Such crew berth upload forces 282 may occur in response to aircraft turbulence and/or during flight maneuvers that impose negative g-loads on the aircraft 402 (FIG. 2).

Figure 4:
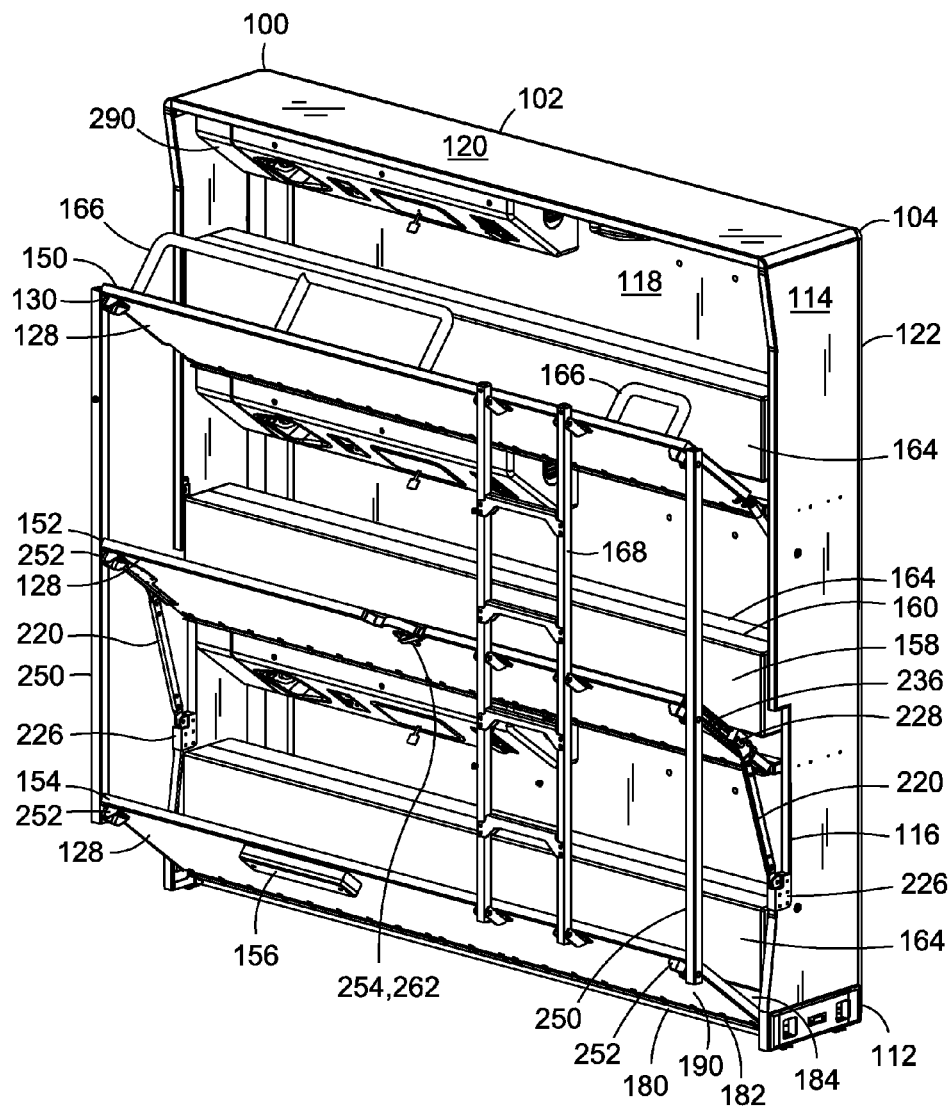
FIG. 4 is a perspective view of the crew bunk system wherein the crew berths are shown midway between the deployed position at a stowed position.

Shown in FIG. 4 is the bunk frame assembly 102 illustrating the foldable panels 190 during upward pivoting thereof from the deployed position 200 toward the stowed position 204. The connecting member 250 and/or the access ladder 168 interconnecting the foldable panels 190 facilitates simultaneous pivoting of the foldable panels 190. The crew berth mattresses 158 are shown in the folded position 164 as illustrated in FIG. 9.

Figure 5:
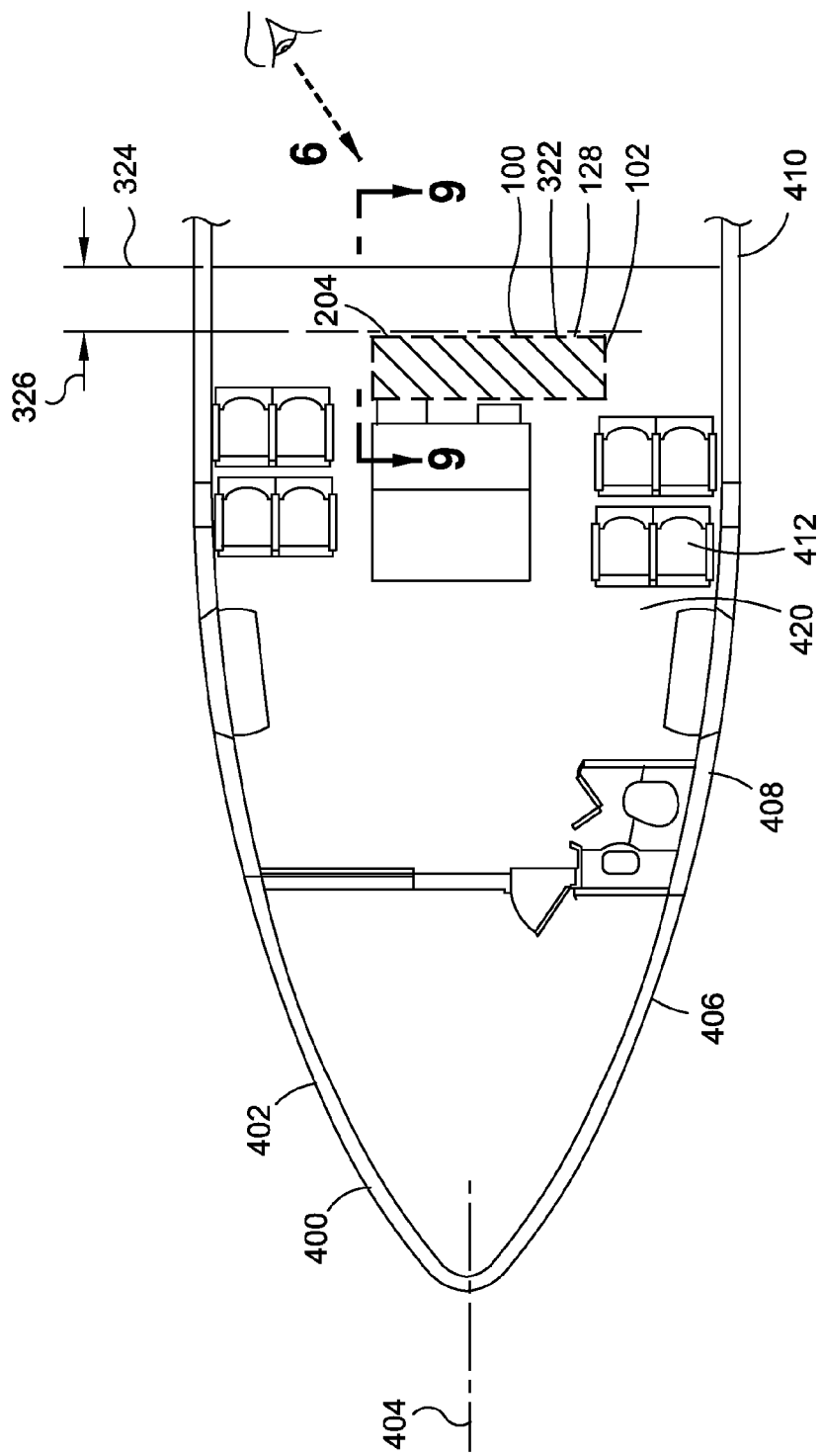
FIG. 5 is a top view of the cockpit and crew area wherein the crew bunk system is illustrated in a stowed position and occupying a stowed footprint.

In FIG. 5, shown is a top view of the cockpit and crew area 408 and illustrating the crew bunk system 100 (shown in cross-hatch) with the foldable panels 190 (FIG. 4) in the stowed position 204 (FIG. 6). With the foldable panels 190 in the stowed position 204, the crew bunk system 100 has a stowed footprint 322 that occupies a reduced amount of the crew area 408 relative to the deployed footprint 320 (FIG. 2). In an embodiment, the crew bunk system 100 may be configured such that when the foldable panels 190 are in the stowed position 204, the stowed footprint 322 of the crew bunk system 100 is at least 30 percent less than the deployed footprint 320 (FIG. 2) of the crew bunk system 100. In this regard, the crew bunk system 100 may be configured such that the stowed footprint 322 of the crew bunk system 100 is at least 50 percent less than the deployed footprint 320. However, the crew bunk system 100 may be configured such that the stowed footprint 322 is less than 30 percent of the deployed footprint 320. Advantageously, the collapsible nature of the crew bunk system 100 provides a means for eliminating interference between the cargo net extension zone 326 and the crew bunk system 100 during taxiing, take-off, and landing, or during other phases of aircraft operation.

FIG. 6 is a perspective view of the crew bunk system 100 wherein the foldable panels 190 are locked or latched in the stowed position 204. The foldable panels 190 may be locked or latched in position using the latching mechanism 254 which is shown mounted to the middle crew berth 152. In the embodiment shown, the stationary panels 184 and foldable panels 190 are sized and configured such that the foldable panels 190 are generally aligned with the edges of the side walls 114 of the bunk frame assembly 102 when the foldable panels 190 are in the stowed position 204. In this manner, the stowed footprint 322 (FIG. 5) of the crew bunk assembly is minimized.

Figure 7:
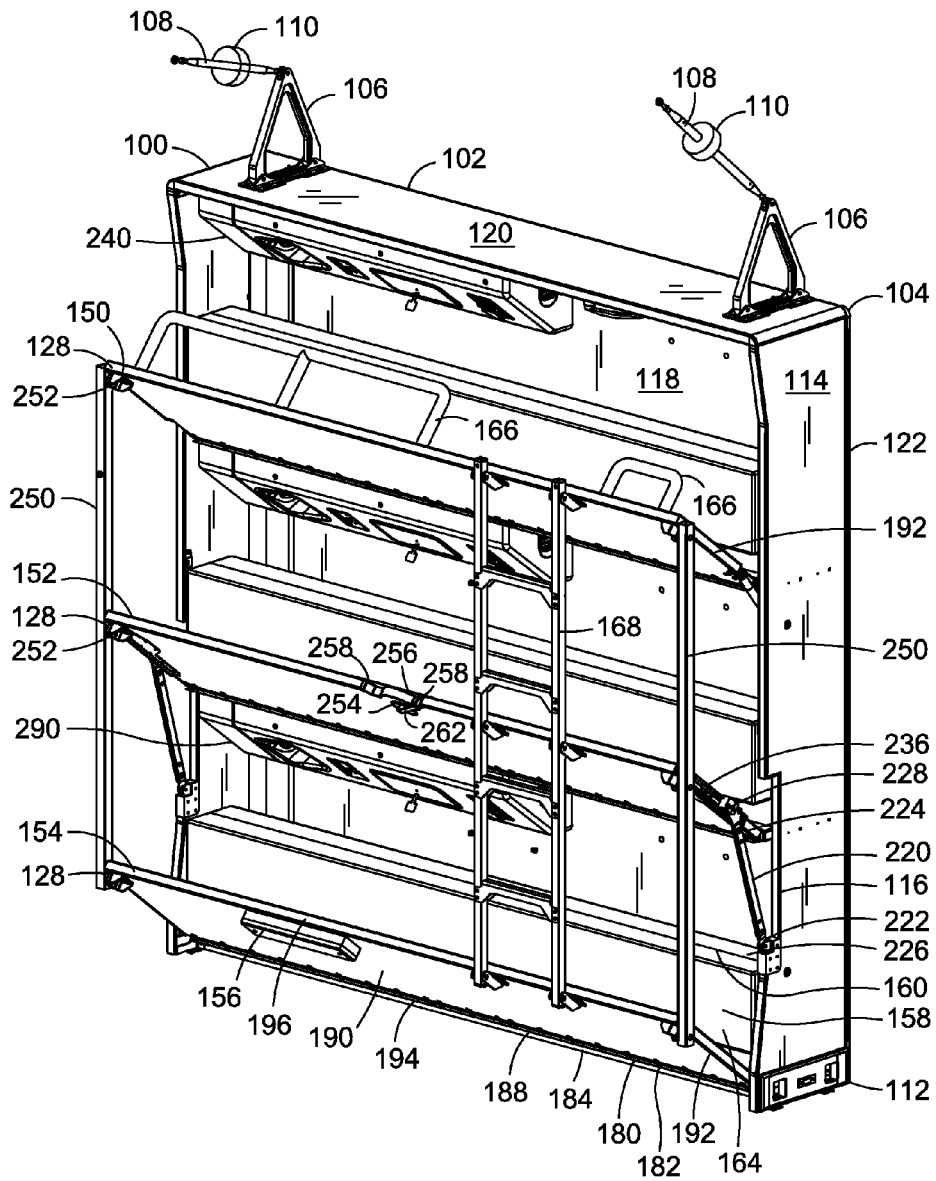
FIG. 7 is a perspective view of the crew bunk system illustrating brackets mounted to the upper end of the bunk frame assembly for attaching the crew bunk system to a ceiling structure of the aircraft.

FIG. 7 is a perspective view of the crew bunk system 100 having a pair of brackets 106 mounted to the upper end 104 of the bunk frame assembly 102. Although a pair of the brackets 106 are shown, any number of brackets 106 may be provided and may be positioned at any location on the bunk frame assembly 102 including, but not limited to, the side walls 114, the back wall 118, or to any other location on the bunk frame assembly 102. Each one of the brackets 106 may include a tie rod 108 for coupling the bracket 106 to the aircraft 402 (FIG. 5). Each one of the tie rods 108 may include a moisture barrier 110 to minimize or prevent condensation on the tie rods 108 from traveling down the tie rod 108 and collecting on the bunk frame assembly 102 as may otherwise occur due to the temperature difference between the relatively cold aircraft structure outer skin (not shown) and the relatively warmer bunk frame assembly 102.

Figure 8:
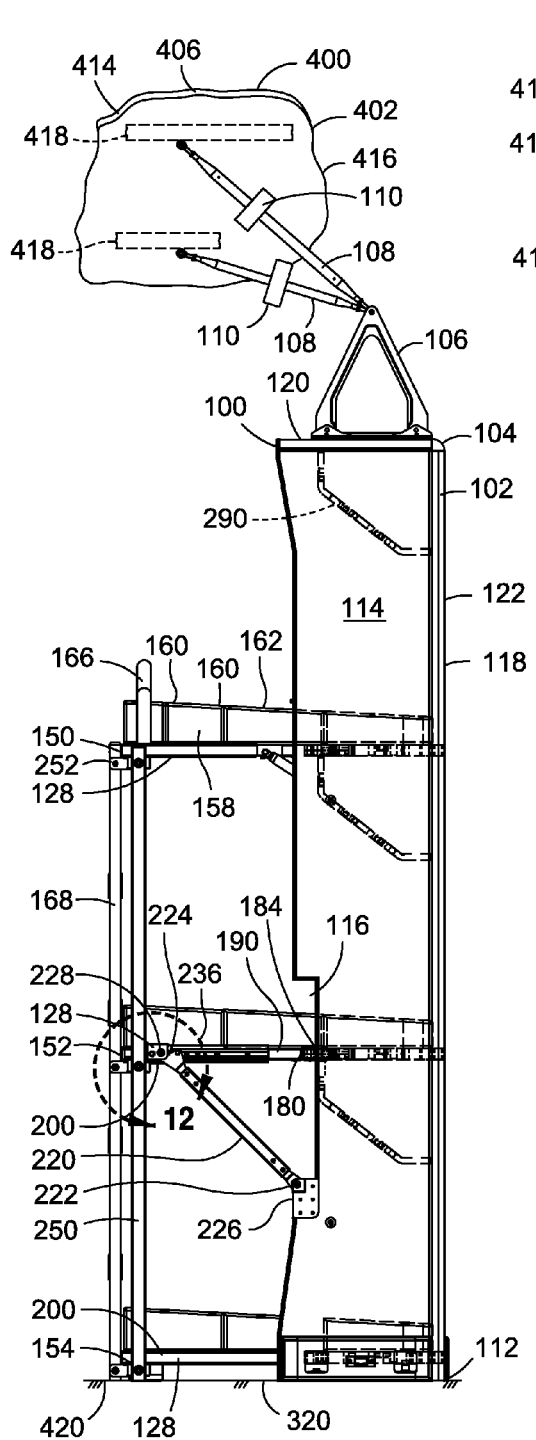
FIG. 8 is a side view of the crew bunk system taken along line 8 of FIG. 2 and illustrating the crew berths in the deployed position.
Figure 9:
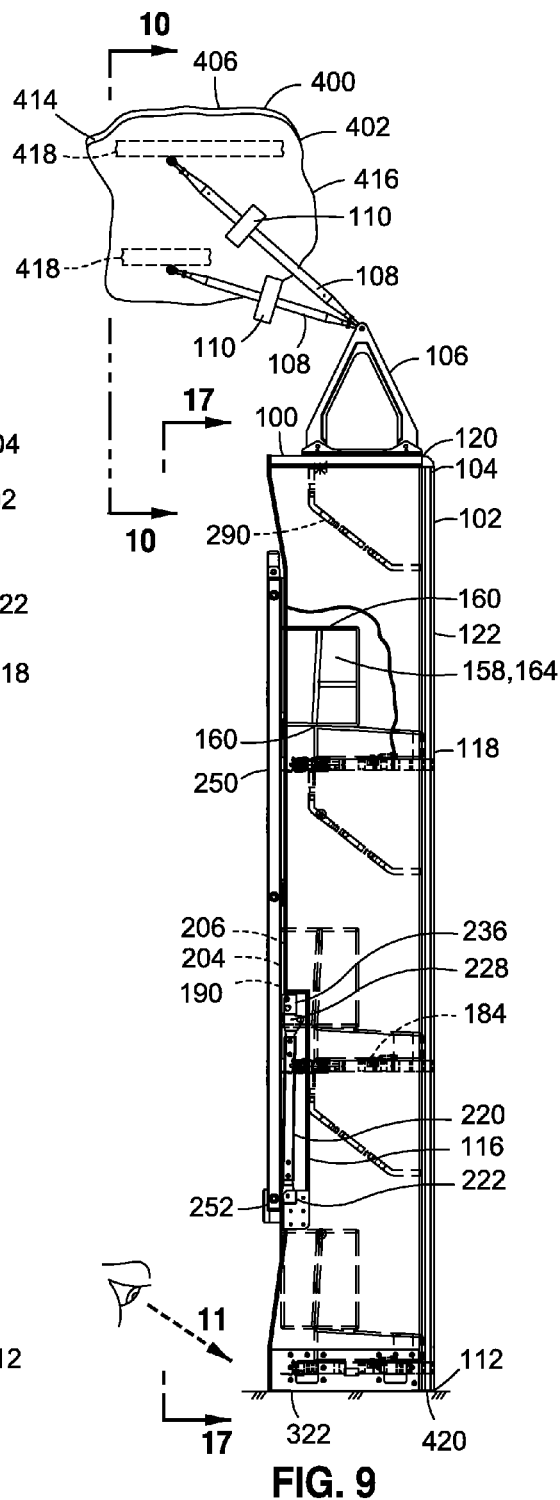
FIG. 9 is a side view of the crew bunk system taken along line 9 of FIG. 5 illustrating the crew berths in the stowed position.

FIG. 8 is a side view of the crew bunk system 100 with the foldable panels 190 in the deployed position 200. The tie rods 108 can be seen extending between the brackets 106 and a ceiling structure 414 of the aircraft 402. For example, the ceiling structure 414 may include one or more frame members or stringers 418 mounted to an interior of a skin panel 416 of the aircraft fuselage 406. The bracket assemblies 106 and tie rods 108 may be configured to restrain the upper end 104 of the crew on assembly against forward and aft movement. The lower end 112 of the crew bunk system 100 may be fixedly coupled to a floor structure 420 as described in greater detail below.

FIG. 8 further illustrates a configuration of the crew berth mattresses 158 which may have a cross-sectional shape that may be slightly tapered toward the back wall 118 of the bunk frame assembly 102 to compensate for aircraft pitch during flight so that an occupant will have a generally level sleeping surface. Also shown are three (3) fold lines 160 of the crew berth mattresses 158 which may facilitate folding of the crew berth mattresses 158 prior to moving the foldable panels 190 from the deployed position 200 to the stowed position 204 (FIG. 9).

FIG. 9 is a side view of the crew bunk system 100 with the foldable panels 190 in the stowed position 204. The crew berth mattresses 158 are shown with the outer portions of the crew berth mattresses 158 folded over one another. However, FIG. 9 illustrates an embodiment of the crew berth mattresses 158 and is not intended to limit alternative embodiments for folding, stowing, or otherwise preparing the crew berth mattresses 158 such that the foldable panels 190 may be moved toward the stowed position 204.

Figure 10:
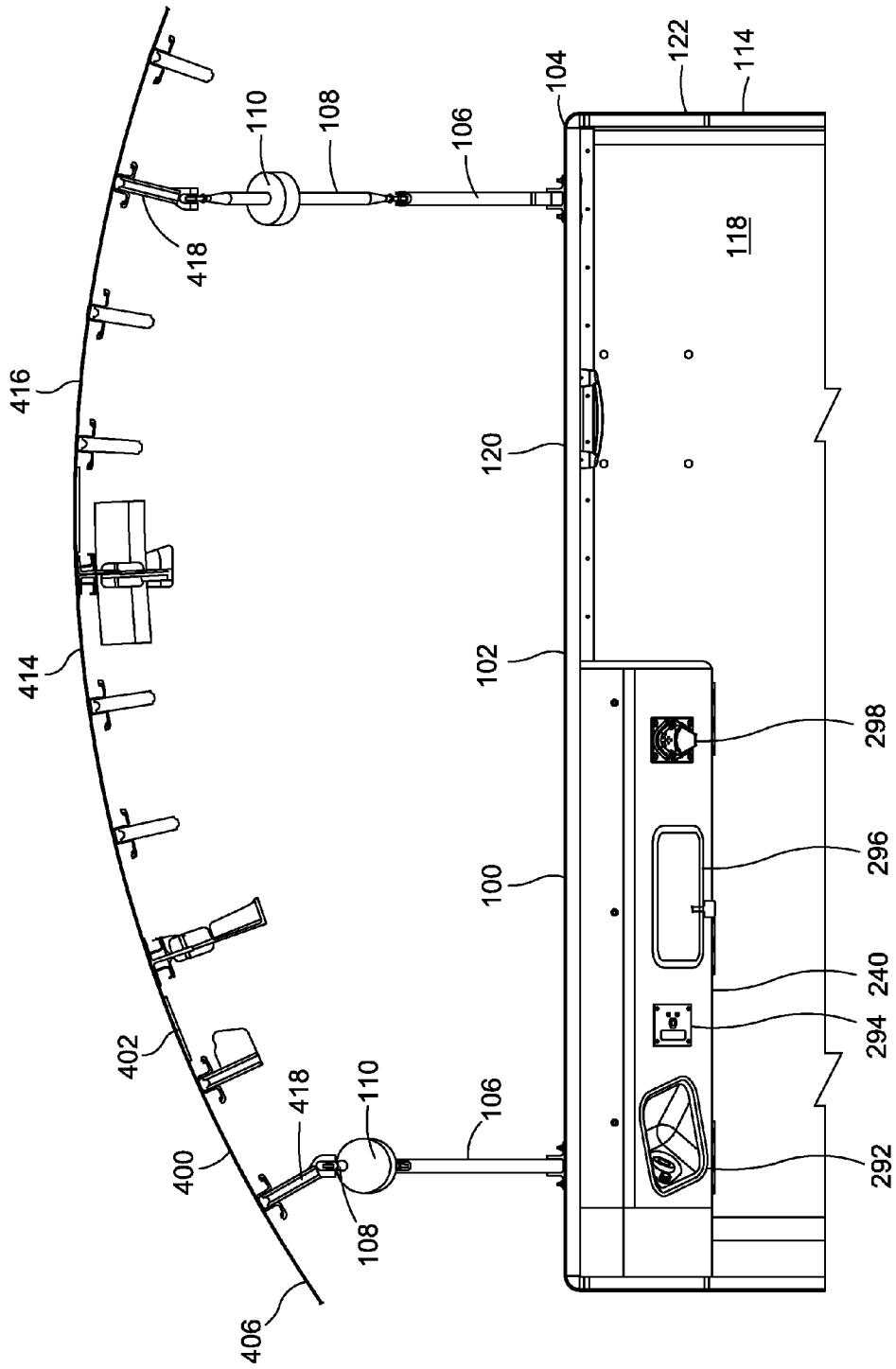
FIG. 10 is a view taken along line 10 of FIG. 9 and illustrating tie rods attaching the upper end of the crew bunk system to the ceiling structure.

FIG. 10 is a view looking aft of the upper end 104 of the bunk frame assembly 102 and illustrating the interconnection of the upper end 104 to the ceiling structure 414 of the aircraft 402. The ceiling structure 414 may include one or more frame members and/or stringers 418 to which the tie rods 108 may be coupled. However, the upper end 104 of the bunk frame assembly 102 may be coupled to any portion of the aircraft 402 for restraining the upper end 104 from movement and is not limited to attachment to the ceiling structure 414.

FIG. 10 further illustrates a personal service unit 290 that may optionally be included with each one of the crew berths 128 (FIG. 9). The personal service units 290 may be mounted above the crew berth 128 toward an end thereof. In an embodiment, each one of the personal service units 290 may include a lighting system 292 such as a reading light for the occupant, an audio jack 294, an oxygen drop box 296, a smoke detector 298, and any one of a variety of other amenities including, but not limited to, a video screen or computer screen (not shown) or other amenities. One or more of the personal service units 290 may be mounted to a lower surface with the crew berth 128 overhead and/or coupled to the back wall 118 of the bunk frame assembly 102. The personal service unit 290 of the upper crew berth 150 (FIG. 8) may be mounted to a lower surface of the top wall 120 of the bunk frame assembly 102.

Figure 11:
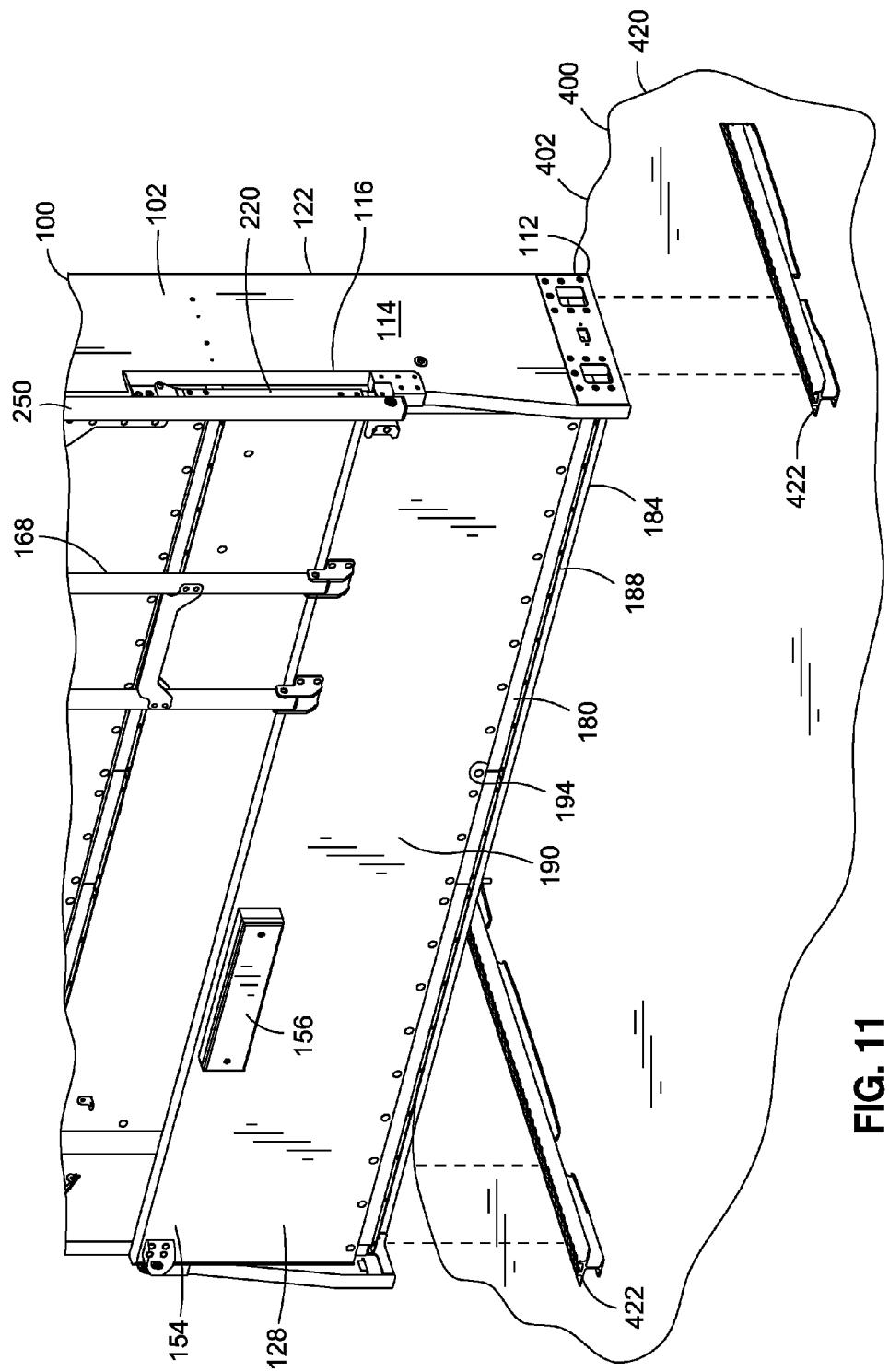
FIG. 11 is a perspective view of a lower end of the crew bunk system taken along line 11 of FIG. 9 and illustrating the attachment thereof to a pair of seat tracks of a floor structure of the aircraft.

FIG. 11 illustrates the attachment of a lower end 112 of the crew bunk system 100 to a floor structure 420 of the aircraft 402. In an embodiment, the side walls 114 on opposite sides of the crew bunk system 100 may be coupled to a corresponding pair of seat tracks 422 that may be included with the floor structure 420 of the aircraft 402. However, the lower end 112 of the crew bunk system 100 may be coupled to an alternative structure of the aircraft 402 and is not limited to attachment to the floor structure 420 shown in FIG. 11. The lower crew berth 154 may optionally include a lower berth support pad 156 for transferring loads of the lower crew berth 154 into the floor structure 420.

Figure 12:
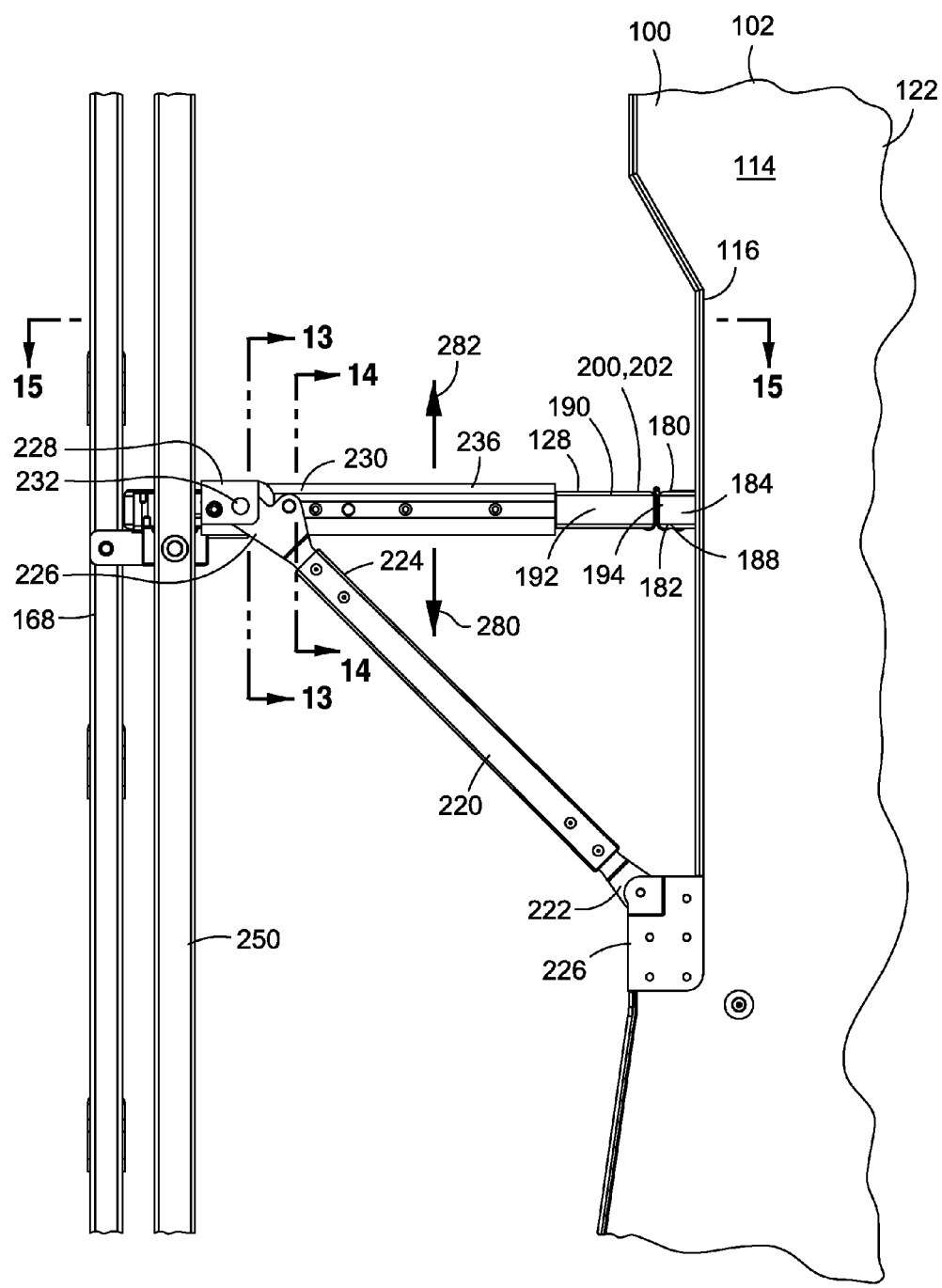
FIG. 12 is a side view of one of the crew berths taken along line 12 of figure eight and illustrating a stationary portion fixedly coupled to a bunk frame assembly and a foldable panel hingedly coupled to the stationary portion and further illustrating a pivoting brace extending between the foldable panel and a side wall of the bunk frame assembly.

Shown in FIG. 12 is a side view of the crew bunk system 100 illustrating a pivoting brace 220 that may be included to couple the foldable panel ends 192 to the side walls 114. Advantageously, the pivoting brace 220 may be lockable in the deployed position 200 by the latching mechanism 254 such that crew berth upload forces 282 may be transmitted from the foldable panels 190 into the side walls 114. In this regard, the pivoting brace 220 may prevent unwanted upward movement of the foldable panel 190 such as may occur during a negative-g maneuver or during turbulence that the aircraft 402 may encounter. The pivoting brace 220 may include a pivotable end 222 and a slidable end 224. In an embodiment, the pivotable end 222 may be pivotably coupled to the side wall 114 by means of a brace pivot bracket 226 that may be mounted to the edge of the side wall 114. The slidable end 224 may be slidably coupled to the foldable panel end 192. When the foldable panel 190 is in the deployed position 200 as shown in FIG. 12, the slidable end 224 of the pivoting brace 220 may be locked to the foldable panel end 192 such that crew berth upload forces 282 may be transmitted from the foldable panel 190, through the pivoting brace 220, and into the side wall 114.

Figure 13:
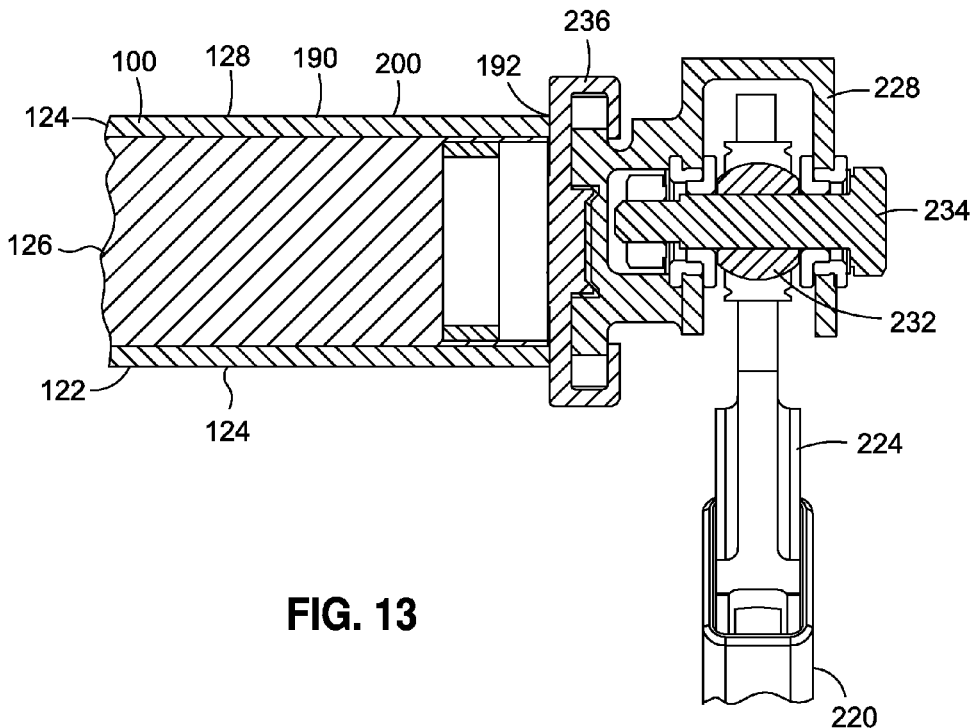
FIG. 13 is a cross-sectional illustration of the crew bunk system taken along line 13 of FIG. 12 and illustrating the attachment of the pivoting brace to the foldable panel.

Referring to FIG. 13, shown is a cross section of the joint between the slider bracket 228 and the pivotable end 222 (FIG. 12) of the pivoting brace 220 and further illustrating the connection between the slider bracket 228 and slider track 236. As indicated earlier, one or more of the foldable panels 190 may include a slider track 236 mounted to one or both of the foldable panel ends 192. The slidable end 224 of the pivoting brace 220 may include a ball end 232 coupled to the slider bracket 228 by a mechanical fastener 234 or other suitable means. The slider bracket 228 may be slidably coupled to the slider track 236. The slider track 236 may be mechanically fastened and/or adhesively bonded to the foldable panel 190. The slider bracket 228 and/or slider track 236 may include low friction materials (e.g., Teflon) to minimize friction therebetween. The slider bracket 228 may slide along the slider track 236 when the latch mechanism 254 (FIG. 15) is unlocked and the foldable panel 190 is moved between the deployed position 200 and the stowed position 204 (FIG. 9).

Figure 14:
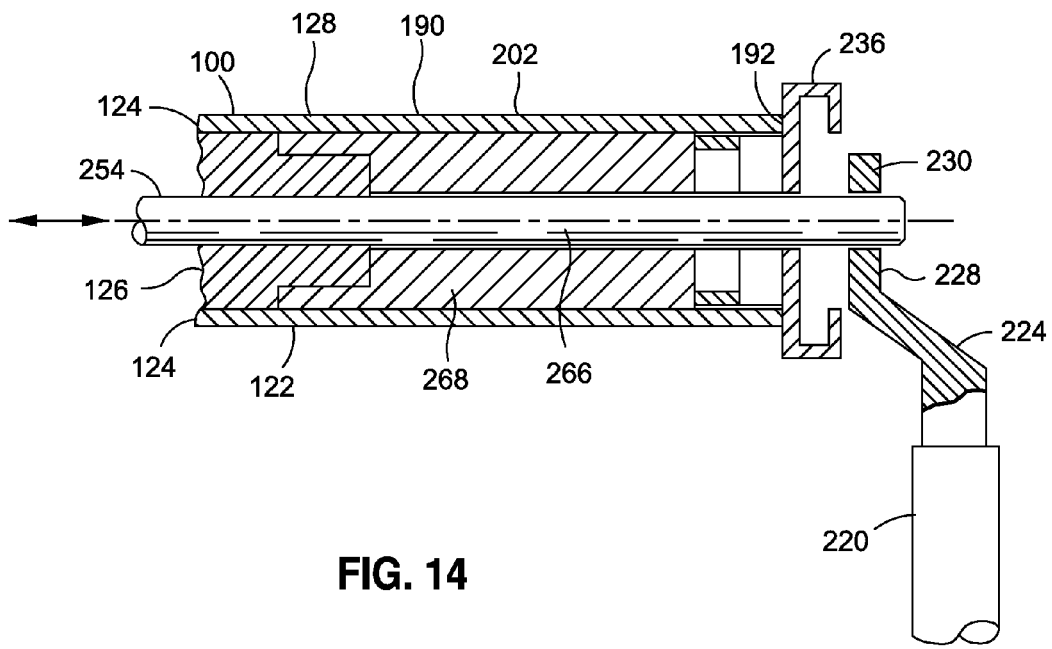
FIG. 14 is a cross-sectional illustration of the crew bunk system taken along line 14 of FIG. 12 and illustrating a translating pin for locking the foldable panel in the deployed position.
Figure 15:
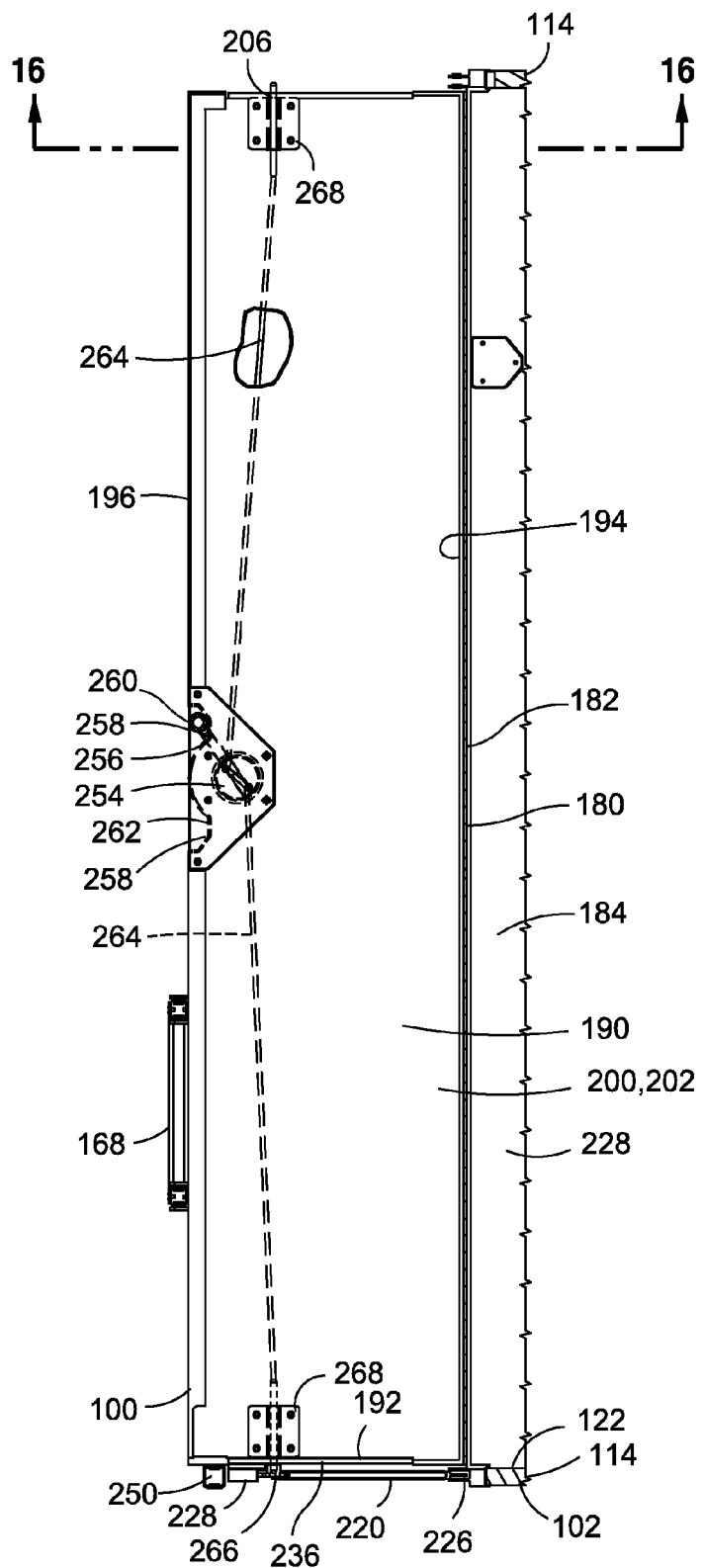
FIG. 15 is a top view of one of the crew berths taken along line 15 of FIG. 12 and illustrating a latching mechanism for locking the foldable panels in the deployed position.

Referring to FIG. 14, shown is a cross section of the slidable end 224 of the pivoting brace 220 locked to the foldable panel 190. In the embodiment shown, the foldable panel 190 may include a pin bracket 268 which may include a bore 272 (FIG. 18) for receiving a translatable pin 266. The translatable pin 266 may be coupled to a connecting rod 264 (FIG. 15) of the latching mechanism 254. The connecting rod 264 may be coupled to a rotary latch lever 256 as shown in FIG. 15. By moving the rotary latch lever, the translatable pin 266 may be extended though the slider track 236 and into a bore 230 formed in the slider bracket 228 for locking the foldable panel 190 in the deployed position 200. In the embodiment shown, the pin bracket 268 may be sandwiched between a pair of face sheets 124 of the foldable panel 190. However, the slider bracket 228 may be mounted on an exterior of the foldable panel 190.

Referring to FIG. 15, shown is a top view of an embodiment of the latching mechanism 254 that may be mounted to one of the foldable panels 190. The latching mechanism 254 may be configured to facilitate locking the foldable panels 190 in the deployed position 200 and/or in the stowed position 204 (FIG. 9). As indicated above, the latching mechanism 254 may include a rotary latch lever 256 that may be mounted to the foldable panel 190 such as on the foldable panel outer side 196. Connecting rods 264 on each side of the latch lever 256 may extend to the translatable pins 266 mounted within the pin brackets 268 on each one of the foldable panel ends 192. The rotary latch lever 256 may be rotated between a latched position 260 and in unlatched position 262 represented by the two detents 258 formed in the foldable panel outer side 196. Movement of the rotary latch lever 256 to the latched position 260 may facilitate engagement of the translator pins to the slider brackets 228 to lock the foldable panel 190 to the pivoting brace 220 located at the foldable panel ends 192. Moment of the rotary latch lever 256 to the unlatched position 262 may facilitate disengagement of the translator pins from the slider bracket 228s to allow the foldable panels 190 to be moved toward the stowed position 204.

Figure 16:
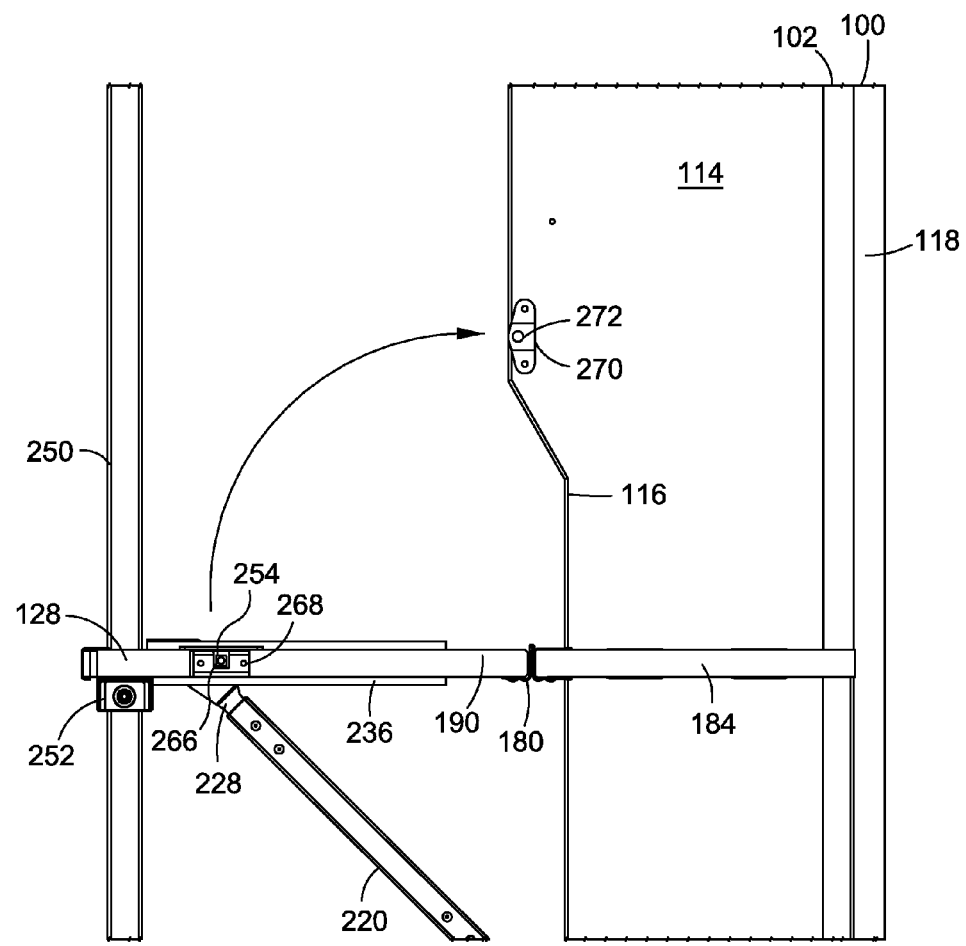
FIG. 16 is a cross-sectional illustration of the crew bunk system taken along line 16 of FIG. 15 and illustrating the foldable panel hinge coupled to the stationary panel and being movable from the deployed position to the stowed position for locking to the side wall.

FIG. 16 is a cross-section of the crew bunk system 100 illustrating the pin bracket mounted to the foldable panel 190 and further illustrating a side wall bracket 270 mounted to the side wall 114 of the frame assembly. The side wall bracket 270 may include a bore 272 that may be sized and configured to receive the translatable pin 266 for locking the foldable panel 190 to the side wall 114. The side wall 114 may optionally include a relief 116 for receiving the pivoting brace 220 when the foldable panel 190 is moved into the stowed position 204 (FIG. 9). FIG. 16 further illustrates an embodiment of a member attach bracket 252 for pivotably attaching the connecting member 250 to the foldable panel 190.

Figure 17:
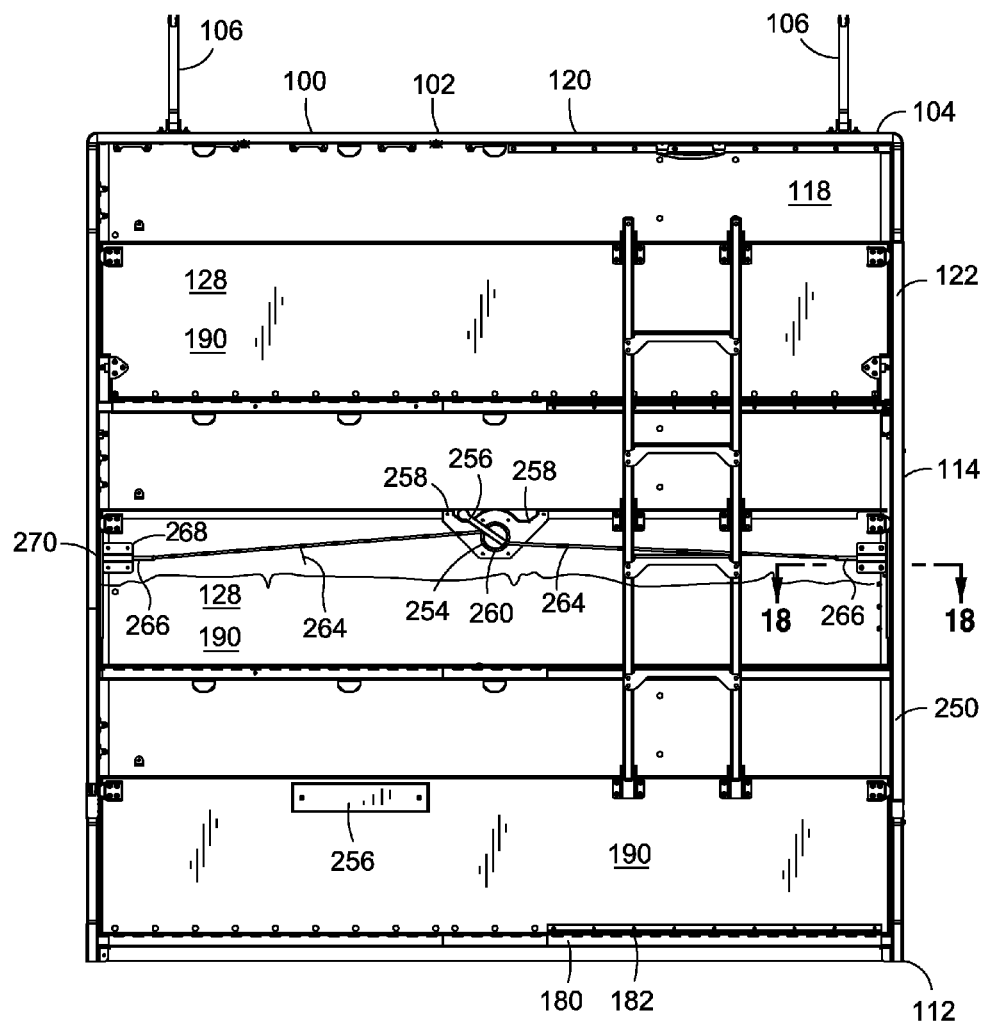
FIG. 17 is a view of the crew bunk system taken along line 17 of FIG. 9 and illustrating the latch mechanism for locking the foldable panels in the stowed position.

FIG. 17 is an aft-looking view of the crew bunk system 100 wherein a portion of the middle crew berth 152 (FIG. 7) is partially cut away to illustrate the latching mechanism 254. As indicated previously, the latching mechanism 254 may include a rotary latch lever 256 that may be moved from a latched position 260 to an unlatched position 262. Each connecting rod 264 may connect the rotary latch lever 256 to one of the translatable pins 266 that is slidable within the pin bracket 268. Although the latching mechanism 254 is shown incorporated into the middle crew berth 152, the latching mechanism 254 may be incorporated into any one of the crew berths 128 and is not limited to the middle crew berth 152. Furthermore, the latching mechanism 254 shown in FIG. 17 is not to be construed as limiting alternative arrangements for the latching mechanism 254. For example, although not shown, each one of the foldable panel ends 192 (FIG. 15) may have individual latching mechanism for coupling the foldable panel 190 to a pivoting brace 220.

Figure 18:
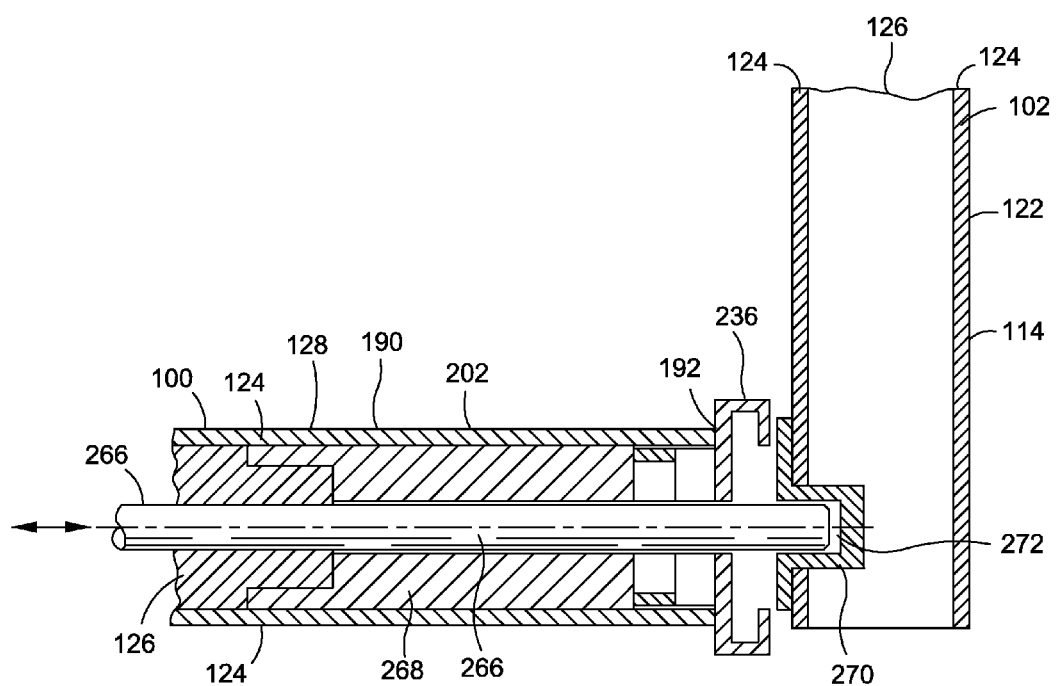
FIG. 18 is a cross-sectional illustration of the bunk frame assembly taken along line 18 of FIG. 17 and illustrating a translatable pin received within a side wall bracket for locking the foldable panels in the stowed position.

FIG. 18 is a cross-section of the crew bunk system 100 showing the translatable pin 266 engaged within a bore 272 formed in the side wall bracket 270 for locking the foldable panels 190 in the stowed position 204 (FIG. 6). In the embodiment shown, the side wall bracket 270 may be mechanically fastened and/or adhesively bonded to the side wall 114. However, the side wall bracket 270 may be provided in any one of a variety of configurations and is not limited to the configuration shown in FIG. 18. For example, although not shown, the side wall bracket 270 may be mounted on an edge of the side wall 114 and may be configured to receive a translatable pin 266 that may be mounted on an exterior surface of the foldable panel 190.

Figure 19:
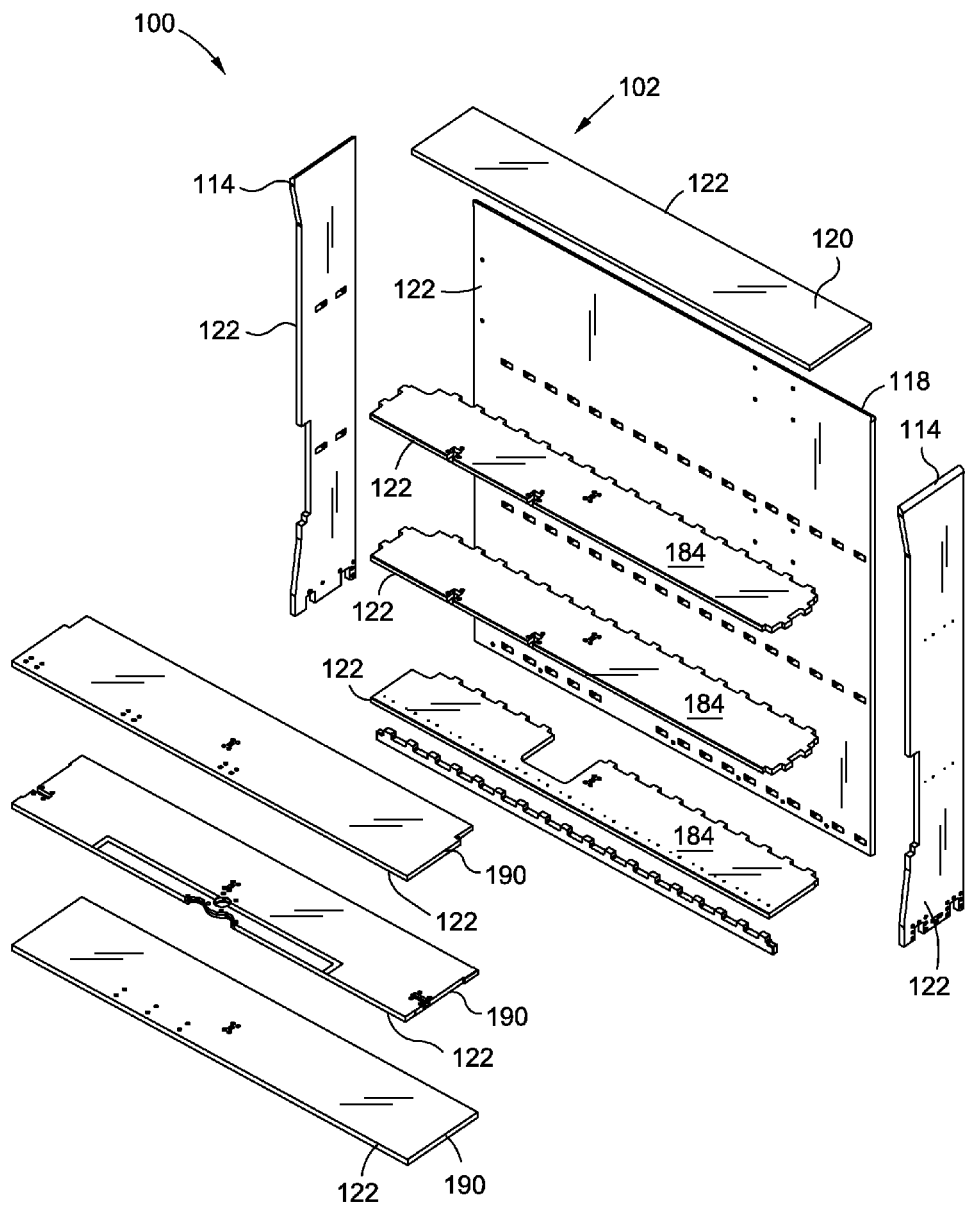
FIG. 19 is an exploded perspective illustration of the crew bunk system.

FIG. 19 is an exploded perspective view of the crew bunk system 100. In the arrangement shown, the bunk frame assembly 102 may be formed of sandwich panels 122. Likewise, the stationary panels 184 and the foldable panels 190 of the crew berths 128 (FIG. 18) may be formed of sandwich panels 122. The sandwich panels 122 may comprise a pair of opposing face sheets 124 (FIG. 18) separated by a core 126 (FIG. 18). For example, the face sheets 124 may be formed of graphite epoxy material thermosetting material and/or thermoplastic material. Alternatively, the face sheets 124 may be formed of metallic material such as aluminum or other metallic material. The core 126 material is preferably a relatively lightweight material and may include foam, honeycomb, or other lightweight material that results in a relatively stiff panel when bonded to the face sheets 124.

The side walls 114, the back wall 118, and the top wall 120 may be fixedly coupled together or assembled by any suitable means including mechanical fastening and/or to adhesive bonding. Optionally, the side walls 114, the back wall 118, and the top wall 120 may be assembled using a tab-and-slot arrangement in combination with adhesive bonding. However, the walls 114, 116, 118 of the bunk frame assembly 102 may be fastened together using any suitable means. The stationary panels 184 may likewise be mechanically fastened and/or adhesively bonded to the side walls 114 and back wall 118 and may further include the use of a tab-and-slot arrangement. Each one of the foldable panels 190 may be hingedly coupled to the corresponding stationary panel 184 at the hinge(s) 180 using mechanical fastening and/or adhesive bonding or other method.

Figure 20:
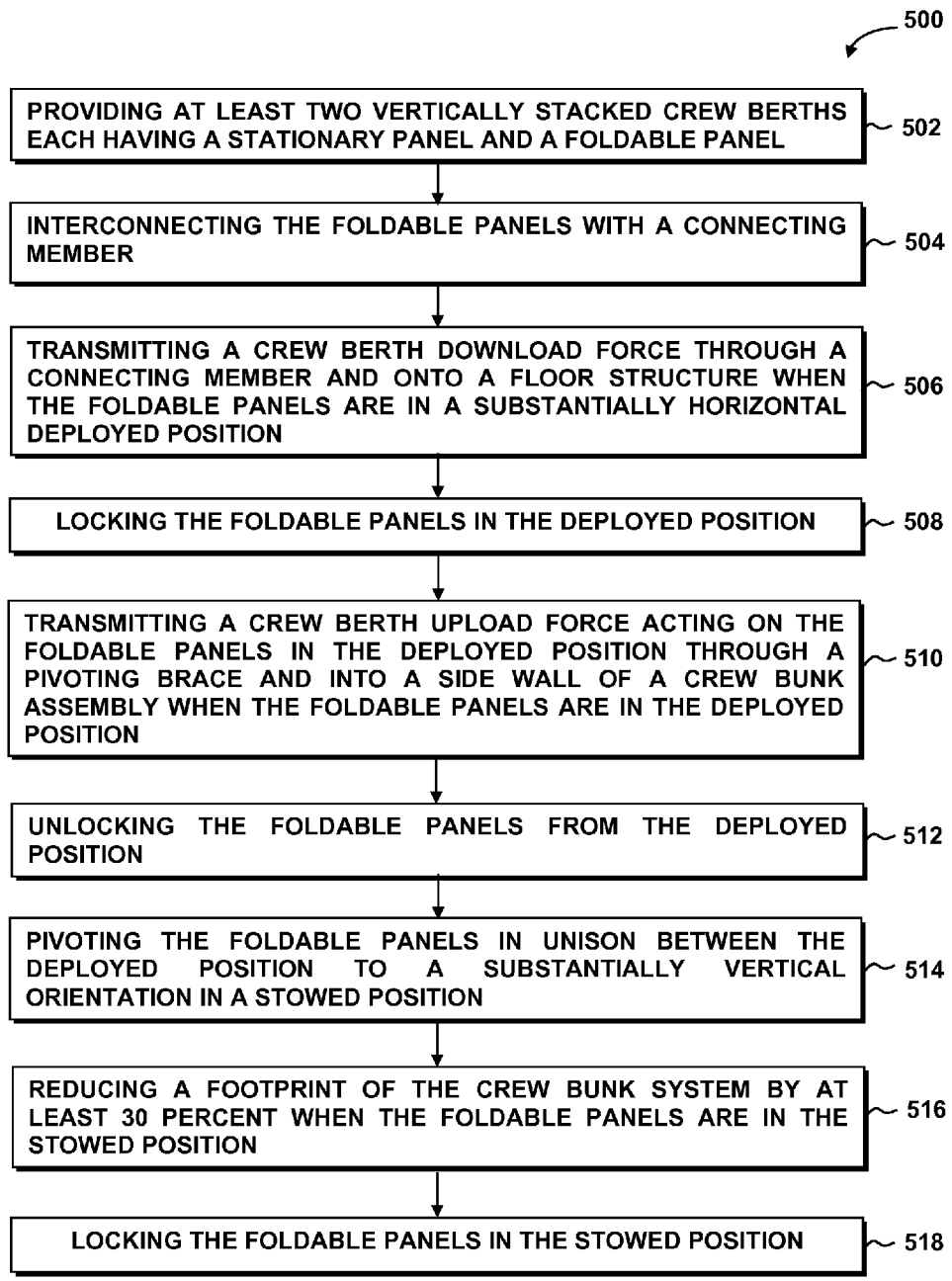
FIG. 20 is a flow diagram illustrating one or more operations that may be included in a method for operating a crew bunk system.

Referring to FIG. 20, shown is a method 500 of operating a crew bunk system 100 such as the embodiment illustrated in FIGS. 2-19. Advantageously, the method 500 provides a means for increasing the utility of the cargo net extension zone 326 (FIG. 2) which is otherwise unoccupied during the majority of the duration of a flight. In this regard, the method 500 disclosed herein provides a means for using the cargo net extension zone 326 in most phases of aircraft operation except for during taxiing, take-off, and landing, and/or other phases.

Step 502 of the method 500 of FIG. 20 may include providing the crew berths 128 (FIG. 3) in a vertically stacked arrangement similar to that which is illustrated in FIG. 3. As indicated above, each one of the crew berths 128 may include the stationary panel 184 (FIG. 3) and the foldable panel 190 (FIG. 3) which may be hingedly coupled to the stationary panel 184. Each one of the stationary panels 184 may be mounted to a bunk frame assembly 102 (FIG. 3) having an upper end 104 (FIG. 10) that may be coupled to a ceiling structure 414 (FIG. 10) and a lower end 112 (FIG. 11) that may be coupled to a floor structure 420 (FIG. 11).

Step 504 of the method 500 of FIG. 20 may include interconnecting the foldable panels 190 (FIG. 3) with a connecting member 250 (FIG. 3) as shown in FIG. 3. The connecting member 250 may be pivotably coupled to the each one of the foldable panels 190 such as at the foldable panel ends 192 (FIG. 3) on the foldable panel 190 outer corners 130 (FIG. 3). Optionally, the foldable panels 190 may be interconnected by an access ladder 168 (FIG. 3) that may be pivotally attached to the outer side of the foldable panels 190.

Step 506 of the method 500 of FIG. 20 may include transmitting a crew berth download force 280 (FIG. 12) through the connecting member 250 (FIG. 12) and onto a floor structure 420 (FIG. 8) when the foldable panels 190 are in a substantially horizontal deployed position 200 (FIG. 12). Such a crew berth download force 280 may occur due to the force of the gravity acting on the crew berth 128 (FIG. 9) whether occupied or unoccupied. The magnitude of the crew berth download force 280 may increase due to flight maneuvering such as during take-off and climb-out, during landing, or due to turbulence that the aircraft 402 may encounter such as at cruising altitude.

Step 508 of the method 500 of FIG. 20 may include locking the foldable panels 190 (FIG. 12) in the deployed position 200. For example, a user may lock the foldable panels 190 in the deployed position 200 by moving the rotary latch level 256 (FIG. 15) of the latching mechanism 254 into the latched position 260 (FIG. 15) when the translatable pins 266 (FIG. 14) are aligned with the bores 230 formed in the slider brackets 228 (FIG. 15) of the pivoting braces 220 (FIG. 14).

Step 510 of the method 500 of FIG. 20 may include transmitting a crew berth upload force 282 (FIG. 12) that may act on the foldable panels 190 (FIG. 12) in the deployed position 200 (FIG. 12). Such crew berth upload forces 282 may be transmitted through the pivoting brace 220 (FIG. 12) and into the side walls 114 (FIG. 12) of the bunk frame assembly 102 (FIG. 12). Crew berth upload forces 282 may occur due to turbulence encountered by the aircraft 402 and/or due to maneuvering of the aircraft 402 such as during initial descent from cruising altitude.

Step 512 of the method 500 of FIG. 20 may include unlocking the foldable panels 190 (FIG. 8) from the deployed position 200 (FIG. 8) by moving the rotary latch lever 256 (FIG. 15) of the latching mechanism 254 (FIG. 15) from the latched position 260 (FIG. 15) to the unlatched position 262 (FIG. 15). In preparation for moving the foldable panels 190 into the stowed position 204 (FIG. 9), a user may fold the crew berth mattresses 158 (FIG. 9) along the fold lines 160 as shown in FIG. 9

Step 514 of the method 500 of FIG. 20 may include pivoting the foldable panels 190 (FIG. 4) in unison. For example, the foldable panels 190 may be pivoted between a substantially horizontal orientation 202 in the deployed position 200 (FIG. 3) to a substantially vertical orientation 206 (FIG. 9) in a stowed position 204 (FIG. 6). Advantageously, pivoting of the foldable panels 190 may occur in unison due to the interconnection of the foldable panels 190 by the connecting members 250 (FIG. 15) as described above.

Step 516 of the method 500 of FIG. 20 may include reducing the horizontal cross-sectional area (e.g., footprint) occupied by the crew bunk system 100 (FIG. 5) by moving the foldable panels 190 (FIG. 4) from the deployed position 200 (FIG. 4) to the stowed position 204 (FIG. 6). For example, the crew bunk system 100 may be configured such that footprint of the crew bunk system 100 is reduced by at least 30 percent when the foldable panels 190 are moved from the deployed position 200 to the stowed position 204.

Step 518 of the method 500 of FIG. 20 may include locking the foldable panels 190 (FIG. 4) in the stowed position 204 (FIG. 18). For example, the foldable panels 190 may be locked to the side walls 114 (FIG. 18) by rotating the rotary latch lever 256 (FIG. 15) into the locked position such that the translatable pins 266 (FIG. 18) are received within the bores 272 (FIG. 18) in the side wall brackets 270 (FIG. 18). Advantageously, the process of unlocking the foldable panels 190 from the deployed position 200 (FIG. 4), upwardly pivoting the foldable panels 190 into the stowed position 204, and locking the panels in the stowed position 204 may be performed by a single individual in a relatively short period of time.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A crew bunk system, comprising:
   a bunk frame assembly including a spaced pair of side walls;
   at least two vertically spaced crew berths, each one of the crew berths having a lengthwise hinge line dividing the crew berth into a stationary panel and a foldable panel, the stationary panel being fixedly coupled to the bunk frame assembly, the foldable panel being hingedly coupled to the stationary panel along the hinge line;
   at least one connecting member interconnecting the foldable panels such that the foldable panels pivot in unison between a deployed position and a stowed position;
   a pivoting brace supporting an end of a foldable panel and having a pivotable end pivotably coupled to a side wall and a slidable end coupled to a slider bracket slidable along the end of the foldable panel during movement between the deployed and stowed position;
   a latching mechanism configured to lock the foldable panels in the deployed position and in the stowed position, the latching mechanism including:
   a latch lever;
   at least one connecting rod coupling the latch lever to a translatable pin mounted to the end of the foldable panel; and
   the latching mechanism being configured in a manner such that movement of the latch lever causes axial movement of the translatable pin and engagement thereof with the slider bracket to lock the foldable panel in the deployed position.

2. The crew bunk system of claim 1, wherein:
   the crew bunk system has a stowed footprint when the foldable panels are in the stowed position that is at least 30 percent less than a deployed footprint when the foldable panels are in the deployed position.

3. The crew bunk system of claim 1, wherein:
   the foldable panel of each one of the crew berths is pivotable from a substantially horizontal orientation in the deployed position to a substantially vertical orientation in the stowed position.

4. The crew bunk system of claim 1, wherein:
the side walls are interconnected by a back wall and a top wall.

5. The crew bunk system of claim 4, wherein:
at least one of the side walls, the back wall, and the top wall being formed of sandwich panel.

6. The crew bunk system of claim 1, wherein:
the bunk frame assembly has an upper end and a lower end;
the upper end being coupled to a ceiling structure; and
the lower end being supported on a floor structure.

7. The crew bunk system of claim 1, wherein:
the bunk frame assembly includes three of the crew berths interconnected by the connecting member and being pivotable in unison between the deployed position and the stowed position.

8. The crew bunk system of claim 1, wherein:
the connecting member transmits a crew berth download force onto a floor structure when the foldable panels are in the deployed position.

9. The crew bunk system of claim 1, further comprising:
an access ladder interconnecting the crew bunks and pivotably attached to a foldable panel outer side of each one of the foldable panels.

10. The crew bunk system of claim 1, further comprising:
at least one of the crew berths having a crew berth mattress supported thereon; and
the crew berth mattress being foldable along at least one lengthwise fold line.

11. A crew bunk system for an aircraft, comprising:
a bunk frame assembly attached to an aircraft structure and including a spaced pair of side walls;
at least two vertically spaced crew berths, each one of the crew berths having a lengthwise hinge line dividing the crew berth into a stationary panel and a foldable panel, the stationary panel being fixedly coupled to the bunk frame assembly, the foldable panel being hingedly coupled to the stationary panel along the hinge line;
at least one connecting member interconnecting the foldable panels such that the foldable panels pivot in unison between a deployed position and a stowed position;
at least one pair of pivoting braces supporting opposing ends of a foldable panel, each one of the pivoting braces having a pivotable end pivotably coupled to a side wall and a slidable end slidable along an end of the foldable panel during movement between the deployed and stowed position;
a latching mechanism coupled to at least one of the crew berths, the latching mechanism including:
a latch lever;
a pair of connecting rods extending from opposing sides of the latch lever to a corresponding pair of translatable pins respectively mounted to the opposing ends of the foldable panel; and
the latching mechanism being configured such that movement of the latch lever causes the connecting rod to axially move each one of the translator pins into engagement with a corresponding slider bracket on each of opposing foldable panel ends to lock the pivoting brace in the deployed position.

12. A method of operating a crew bunk system, comprising the steps of:
providing a bunk frame assembly including a spaced pair of side walls and at least two vertically stacked crew berths, each one of the crew berths having a stationary panel and a foldable panel hingedly coupled to the stationary panel;
interconnecting the foldable panels with a connecting member;
pivoting the foldable panels in unison between a deployed position and a stowed position;
supporting at least one of the foldable panels using at least one pair of pivoting braces each having a pivotable end pivotably coupled to a side wall and a slidable end slidable along an end of the foldable panel during pivoting of the foldable panels between the deployed and stowed position;
moving a latch lever of a latching mechanism mounted to one of the foldable panels to cause axial movement of a translatable pin coupled to the latch lever by a connecting rod, the translatable pin mounted to one end of the foldable panel; and
engaging, in response to moving the latch lever, the translatable pin to the slider bracket to lock the foldable panel in the deployed position.

13. The method of claim 12, wherein the step of pivoting the foldable panels in unison comprises:
pivoting the foldable panels from a substantially horizontal deployed position to a substantially vertical stowed position; and
reducing a footprint of the crew bunk system by at least 30 percent when the foldable panels are moved from the deployed position to the stowed position.

14. The method of claim 12, further comprising the step of:
pivoting the foldable panels between a substantially horizontal orientation in the deployed position to a substantially vertical orientation in the stowed position.

15. The method of claim 12, further comprising the step of:
transmitting a crew berth upload force through a pivoting brace and into a side wall when the foldable panels are in the deployed position.

16. The method of claim 12, further comprising the steps of:
mounting the stationary panels to a bunk frame assembly having an upper end and a lower end;
coupling the upper end to a ceiling structure; and
supporting the lower end on a floor structure.

17. The method of claim 12, further comprising the step of:
transmitting a crew berth download force through the connecting member and onto a floor structure when the foldable panels are in the deployed position.

18. The method of claim 12, further comprising:
folding a crew berth mattress prior to pivoting the crew berths in unison from the deployed position toward the stowed position.

* * * * *